(12) United States Patent
Chen et al.

(10) Patent No.: US 9,549,180 B2
(45) Date of Patent: Jan. 17, 2017

(54) DISPARITY VECTOR GENERATION FOR INTER-VIEW PREDICTION FOR VIDEO CODING

(71) Applicant: QUALCOMM Incorporated, San Diego, CA (US)

(72) Inventors: Ying Chen, San Diego, CA (US); Li Zhang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 855 days.

(21) Appl. No.: 13/865,894

(22) Filed: Apr. 18, 2013

(65) Prior Publication Data

US 2013/0287108 A1 Oct. 31, 2013

Related U.S. Application Data

(60) Provisional application No. 61/636,554, filed on Apr. 20, 2012.

(51) Int. Cl.
H04N 19/00 (2014.01)
H04N 19/51 (2014.01)
(Continued)

(52) U.S. Cl.
CPC ...... *H04N 19/00684* (2013.01); *H04N 19/436* (2014.11); *H04N 19/513* (2014.11); *H04N 19/52* (2014.11); *H04N 19/597* (2014.11)

(58) Field of Classification Search
CPC .............................................. H04N 19/00684
(Continued)

(56) References Cited

U.S. PATENT DOCUMENTS 5,612,735 A * 3/1997 Haskell .............. H04N 13/0048
348/43
9,237,345 B2 * 1/2016 Kang ................... H04N 19/597
(Continued)

FOREIGN PATENT DOCUMENTS

WO 2008007913 A1 1/2008
WO 2012007038 A1 1/2012
(Continued)

OTHER PUBLICATIONS

Zheng, et al., "Non-CE13: Simplification and improvement of additional merge candidate", JCT-VC Meeting; MPEG Meeting; Nov. 21, 2011-Nov. 30, 2011; Geneva; (Joint Collaborative Team on Video Coding of ISO/IEC JTC1/SC29/WG11 and ITU-T SG.16); URL:http://WFTP3.ITU.INT/AV-ARCH/JCTVC-SITE/, No. JCTVC-G683, XP030110667, 8 pp.
(Continued)

*Primary Examiner* — Dave Czekaj
*Assistant Examiner* — Shanika Brumfield
(74) *Attorney, Agent, or Firm* — Shumaker & Sieffert, P.A.

(57) ABSTRACT

In one example, a video coder (e.g., a video encoder or a video decoder) is configured to determine that a current block of video data is coded using a disparity motion vector, wherein the current block is within a containing block, based on a determination that a neighboring block to the current block is also within the containing block, substitute a block outside the containing block and that neighbors the containing block for the neighboring block in a candidate list, select a disparity motion vector predictor from one of a plurality of blocks in the candidate list, and code the disparity motion vector based on the disparity motion vector predictor. In this manner, the techniques of this disclosure may allow blocks within the containing block to be coded in parallel.

47 Claims, 16 Drawing Sheets

(51) Int. Cl.
*H04N 19/597* (2014.01)
*H04N 19/52* (2014.01)
*H04N 19/513* (2014.01)
*H04N 19/436* (2014.01)

(58) Field of Classification Search
USPC .......................................... 375/240.02–240.2
See application file for complete search history.

(56) References Cited

U.S. PATENT DOCUMENTS

| | | | |
|---|---|---|---|
| 2005/0046702 A1 | 3/2005 | Katayama et al. | |
| 2005/0206785 A1 | 9/2005 | Swan et al. | |
| 2007/0064800 A1 | 3/2007 | Ha | |
| 2007/0071107 A1 | 3/2007 | Ha | |
| 2008/0159407 A1 | 7/2008 | Yang et al. | |
| 2008/0285654 A1 | 11/2008 | Cai et al. | |
| 2009/0190669 A1 | 7/2009 | Park et al. | |
| 2009/0290643 A1 | 11/2009 | Yang | |
| 2010/0046846 A1 | 2/2010 | Brown | |
| 2010/0091858 A1 | 4/2010 | Yang | |
| 2010/0135391 A1 | 6/2010 | Tian et al. | |
| 2011/0044550 A1 | 2/2011 | Tian et al. | |
| 2011/0103485 A1* | 5/2011 | Sato | H04N 19/105 375/240.16 |
| 2011/0164677 A1* | 7/2011 | Lu | H04N 19/176 375/240.02 |
| 2011/0187830 A1 | 8/2011 | Kwon et al. | |
| 2011/0216833 A1* | 9/2011 | Chen | H04N 13/0022 375/240.16 |
| 2012/0062756 A1 | 3/2012 | Tian et al. | |
| 2012/0147137 A1 | 6/2012 | Jeon et al. | |
| 2012/0189060 A1 | 7/2012 | Lee et al. | |
| 2012/0236115 A1* | 9/2012 | Zhang | H04N 19/597 348/43 |
| 2012/0257678 A1* | 10/2012 | Zhou | H04N 19/436 375/240.16 |
| 2012/0263231 A1 | 10/2012 | Zhou | |
| 2012/0269270 A1 | 10/2012 | Chen et al. | |
| 2012/0269271 A1 | 10/2012 | Chen et al. | |
| 2013/0003848 A1 | 1/2013 | Sugio et al. | |
| 2013/0242046 A1 | 9/2013 | Zhang et al. | |
| 2013/0243092 A1 | 9/2013 | Sugio et al. | |
| 2013/0265388 A1 | 10/2013 | Zhang et al. | |
| 2013/0336405 A1 | 12/2013 | Chen et al. | |
| 2014/0341292 A1 | 11/2014 | Schwarz et al. | |
| 2015/0098509 A1 | 4/2015 | Sung et al. | |

FOREIGN PATENT DOCUMENTS

| | | |
|---|---|---|
| WO | 2012096164 A1 | 7/2012 |
| WO | 2012171442 A1 | 12/2012 |

OTHER PUBLICATIONS

Schwartz, et al., "Test Model under Consideration for HEVC based 3D video coding", MPEG Meeting; San Jose, CA; (Motion Picture Expert Group or ISO/IEC JTC1/SC29/WG11), No. N12559, Feb. 11, 2012 (Feb. 11, 2012), XP030019033, 45 pp.

Bross et al., "High efficiency video coding (HEVC) text specification draft 10 (for FDIS & Last Call)," 12th Meeting: Geneva, CH, Jan. 14-23, 2013, JCTVC-L1003_v34, 310 pp.

Bross et al., "High efficiency video coding (HEVC) text specification draft 7," 9th Meeting: Geneva, CH, Apr. 27-May 7, 2012, JCTVC-I1003_d2, 290 pp.

Bross et al., "High efficiency video coding (HEVC) text specification draft 8," 10th Meeting: Stockholm, SE, Jul. 11-20, 2012, JCTVC-J1003_d7, 261 pp.

Bross et al., "High efficiency video coding (HEVC) text specification draft 6," 8th Meeting: San Jose, CA, USA, Feb. 1-10, 2012, JCTVC-H1003, 259 pp.

Bross et al., "High efficiency video coding (HEVC) text specification draft 9," 11th Meeting: Shanghai, CN, Oct. 10-19, 2012, JCTVC-K1003_v7, 290 pp.

Bross et al., "WD4: Working Draft 4 of High-Efficiency Video Coding," 6th Meeting: JCTVC-F803_d2, Torino, IT, Jul. 14-22, 2011, 226 pp.

Bross et al., "WD5: Working Draft 5 of High-Efficiency Video Coding," 7th Meeting: Geneva, Switzerland, Nov. 21-30, 2011, JCTVC-G1103_d2, 214 pp.

Chen, et al., "AHG12: Hooks for temporal motion vector prediction and weighted prediction in HEVC multiview/3DV extension", JCT-VC Meeting; MPEG Meeting; Apr. 27, 2012-Jul. 5, 2012; Geneva; (Joint Collaborative Team on Video Coding of ISO/IEC JTC1/SC29/WG11 and ITU-T SG.16 ); URL: Http://WFTP3.ITU.INT/AV-ARCH/JCTVC-SITE/, No. JCTVC-I0353, XP030112116, 7 pp.

Hannuksela, et al., "Suggestion for a depth-enhanced multiview video coding extension to H.264, Annex A: Nokia 3DV Test Model (3DV-TM) Codec Description and Simulation Results", VCEG Meeting; MPEG Meeting; Jul. 17, 2011-Jul. 22, 2011; Torino; (Video Coding Experts Group of ITU-T SG.15),, No. VCEG-AR14, XP030003858, 14 pp.

International Search Report and Written Opinion—PCT/US2013/037442—ISA/EPO—Jul. 26, 2013, 11 pp.

ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.

Jeon, et al., "AHG10: Unified design on parallel merge/skip", JCT-VC Meeting; MPEG Meeting; Jan. 2, 2012-Oct. 2, 2012, San Jose, (Joint Collaborative Team on Video Coding of ISO/IEC JTC1/SC29/WG11 and ITU-T SG.16 ); <URL: HTTP://WFTP3.1TU.INT/AV-ARCH/JCTVC-Site/>, No. JCTVC-H0090, XP030111117, 10 pp.

Jeon, et al., "Non-CE9: Improvement on Parallelized Merge/Skip Mode", JCT-VC Meeting; MPEG Meeting; Nov. 21, 2011-Nov. 30, 2011; Geneva; (Joint Colloborative Team on Video Coding of ISO/IEC JTC1/SC29/WG11 and ITU-T SG.16); URL: HTTP://EFTP3.ITU.INT/AV-ARCH/JCTVC-Site/,, No. JCTVC-G164, XP030110148, 7 pp.

Kim, et al., "CU-based Merge Candidate List Construction," Document: JCTVC-G416, Joint Collaborative Team on Video Coding (JCT-VC) of ITU-T SG16 WP3 and ISO/IEC JTC1/SC29/WG11, 7th Meeting: Geneva, No. JCTVCG416, XP030110400, 13 pp.

Nam, et al., "Advanced motion and disparity prediction for 3D video coding", 98. MPEG Meeting; Nov. 28, 2011-Feb. 12, 2011; Geneva; (Motion Picture Expert Group or ISO/IEC JTC1/SC29/WG11),, No. m22560, XP030051123, 6 pp.

Ryu, et al., "Adaptive competition for motion vector prediction in multi-view video coding", 3DTV Conference: The True Vision-Capture, Transmission and Display of 3D Video (3DTV-CON), 2011, IEEE, May 16, 2011, XP031993767, 4 pp.

Schwarz, et al., "Description of 3D Video Coding Technology Proposal by Fraunhofer HHI (HEVC compatible; configuration A)", MPEG Meeting; Nov. 28, 2011-Feb. 12, 2011; Geneva; (Motion Picture Expert Group or ISO/IEC JTC1/SC29/WG11), No. m22570, XP030051133, 46 pp.

Schwarz, et al., "Description of 3D Video Coding Technology Proposal by Fraunhofer HHI (MVC compatible),"MPEG Meeting ISO/IEC JTC1/SC29/WG11, Doc. MPEG11/M22569, Geneva, Switzerland, Nov./ Dec. 2011, 37 pp.

Schwarz, et al., "Description of 3D Video Technology Proposal by Fraunhofer HHI (HEVC compatible, configuration B)", MPEG Meeting;Nov. 28, 2011-Feb. 12, 2011; Geneva; (Motion Picture Expert Group or ISO/IEC JTC1/SC29/WG11), No. m22571, XP030051134; 46 pp.

Schwarz, et al., "Inter-View Prediction of Motion Data in Multiview Video Coding," 2012 Picture Coding Symposium, IEEE, May 7-9, 2012, pp. 101-104.

Senoh, et al., "Disparity vector prediction CE plan for MVC/CE4", 76. MPEG Meeting; Mar. 4, 2006-Jul. 4, 2006; Montreux; (Motion Pictureexpert Group or ISO/IEC JTC1/SC29/WG11), No. M13166, XP030041835, 6 pp.

(56) References Cited

OTHER PUBLICATIONS

Stefanoski, et al., "Description of 3D Video Coding Technology Proposal by Disney Research Zurich and Fraunhofer HHI," MPEG Meeting-ISO/IEC JTC1/SC29/WG11, Doc. MPEG11/M22668, Geneva, Switzerland, Nov./Dec. 2011, 34 pp.

Takahashi, et al., "Descriptions of 3D Video Coding Proposal (HEVC-Compatible Category) by Sony", MPEG Meeting; Nov. 28, 2011-Feb. 12, 2011 Geneva; (Motion Picture Expert Group or ISO/IEC JTC1/SC29/WG11), No. m22566, XP030051129, 36 pp.

Tech, et al., "3D-HEVC Test Model 1," Document JCT3V-A1005_d0, Joint Collaborative Team on 3D Video Coding Extension Development of ITU-T SG 16 WP 3 and ISO/IEC JTC 1/SC 29/WG 11, 1st Meeting: Stockholm, SE, Jul. 16-20, 2012, 83 pp.

"Text of ISO/IEC FDIS 23002-3 Representation of Auxiliary Video and Supplemental Information," ISO/IEC JTC 1/SC 29/WG 11, MPEG Doc, N81368, Marrakech, Morocoo, Jan. 2007, 27 pp.

Wiegand, et al., "WD1: Working Draft 1 of High-Efficiency Video Coding", JCTVC-C403, 3rd Meeting: Guangzhou, CN, Oct. 7-15, 2010, 137 pp.

Wiegand et al., "WD2: Working Draft 2 of High-Efficiency Video Coding," JCTVC-D503, 4th Meeting: Daegu, KR, Jan. 20-28, 2011, 153 pp.

Wiegand et al., "WD3: Working Draft 3 of High-Efficiency Video Coding," Document JCTVC-E603, 5th Meeting: Geneva, CH, Mar. 16-23, 2011, 193 pp.

Yea, et al., "Description of 3D Video Coding Technology Proposed by LG Electronics", MPEG Meeting; Nov. 28, 2011-Feb. 12, 2011; Geneva; (Motion Picture Expert Group or ISO/IEC JTC1/WG11),, No. m22577, XP030051140, 22 pp.

Yu, et al.,"Parallel AMVP candidate list construction", JCT-VC Meeting; MPEG Meeting; Apr. 27, 2012-Jul. 5, 2012; Geneva; (Joint Collaborative Team on Video Coding of ISO/IEC JTC1/SC29/WG11 and ITU-T SG.16); URL: HTTP://WFTP3.ITU.INT/AV-ARCH/JCTVC-Site/,, No. JCTVC-I0036, XP030111799, 7 pp.

Zhang, et al., "3D-CE5.h related: Disparity vector derivation for multiview video and 3DV", MPEG Meeting; Apr. 30, 2012-Apr. 5, 2012; Geneva; (Motion Picture Expert Group or ISO/IEC JTC1/SC29/WG11), No. m24937, XP030053280, 6 pp.

ITU-T H.265, Series H: Audiovisual and Multimedia Systems, Infrastructure of audiovisual services—Coding of moving video, Advanced video coding for generic audiovisual services, The International Telecommunication Union. Apr. 2013, 317 pp.

International Preliminary Report on Patentability from International Application No. PCT/US2013/037442, Oct. 30, 2014, 8 pp.

Bartnik, et al., "HEVC Extension for Multiview Video Coding and Multiview Video plus Depth Coding", ITU—Telecommunications Standardization Sector Study Group 16 Question 6 Video Coding Experts Group (VCEG), 44nd Meeting: San Jose, CA, USA, Feb. 3-10, 2012, Document VCEG-AR13, 42 pp.

ITU-T H.265, Series H: Audiovisual and Multimedia Systems, Infrastructure of audiovisual services—Coding of moving video, High efficiency video coding, The International Telecommunication Union, Oct. 2014, 540 pp.

Lin, et al., "Motion Vector Coding Techniques for HEVC," IEEE 13th International Workshop on Multimedia Signal Processing (MMSP), Jan. 2011, 6 pp.

\* cited by examiner

DISPARITY VECTOR GENERATION FOR INTER-VIEW PREDICTION FOR VIDEO CODING This application claims the benefit of U.S. Provisional Application Ser. No. 61/636,554, filed Apr. 20, 2012, the entire contents of which are hereby incorporated by reference.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. HEVC is being developed by the Joint Collaboration Team on Video Coding (JCT-VC) of ITU-T Video Coding Experts Group (VCEG) and ISO/IEC Motion Picture Experts Group (MPEG). A draft of HEVC is available from http://phenix.int-evry.fr/jct/doc_end_user/documents/8_San%20Jose/wg11/JCTVC-H1003-v22.zip. H.264/AVC includes a Scalable Video Coding (SVC) and a Multiview Video Coding (MVC) extension, which are described in "Advanced video coding for generic audiovisual services," ITU-T Recommendation H.264, March 2010. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to multiview video coding based on advanced codecs, such as codecs configured to perform techniques of the upcoming High Efficiency Video Coding (HEVC) standard. Such advanced codecs may be configured to code two or more views in accordance with HEVC, where images of the views may be rendered substantially simultaneously to produce a three-dimensional (3D) video effect. More specifically, this disclosure describes techniques related to disparity motion vector generation.

In one example, a method of decoding video data includes determining that a current block of video data is encoded using a disparity motion vector, wherein the current block is within a containing block, based on a determination that a neighboring block to the current block is also within the containing block, substituting a block outside the containing block and that neighbors the containing block for the neighboring block in a candidate list, selecting a disparity motion vector predictor from one of a plurality of blocks in the candidate list, and decoding the disparity motion vector based on the disparity motion vector predictor.

In another example, a device for decoding video data includes a video decoder configured to determine that a current block of video data is encoded using a disparity motion vector, wherein the current block is within a containing block, based on a determination that a neighboring block to the current block is also within the containing block, substitute a block outside the containing block and that neighbors the containing block for the neighboring block in a candidate list, select a disparity motion vector predictor from one of a plurality of blocks in the candidate list, and decode the disparity motion vector based on the disparity motion vector predictor.

In another example, a device for decoding video data includes means for determining that a current block of video data is encoded using a disparity motion vector, wherein the current block is within a containing block, means for substituting, based on a determination that a neighboring block to the current block is also within the containing block, a block outside the containing block and that neighbors the containing block for the neighboring block in a candidate list, means for selecting a disparity motion vector predictor from one of a plurality of blocks in the candidate list, and means for decoding the disparity motion vector based on the disparity motion vector predictor.

In another example, a computer-readable storage medium has stored thereon instructions that, when executed, cause one or more processors to determine that a current block of video data is encoded using a disparity motion vector, wherein the current block is within a containing block, based on a determination that a neighboring block to the current block is also within the containing block, substitute a block outside the containing block and that neighbors the containing block for the neighboring block in a candidate list, select a disparity motion vector predictor from one of a plurality of blocks in the candidate list, and decode the disparity motion vector based on the disparity motion vector predictor.

In another example, a method of encoding video data includes encoding a current block of video data, within a containing block, using a disparity motion vector, based on a determination that a neighboring block to the current block is also within the containing block, substituting a block outside the containing block and that neighbors the containing block for the neighboring block in a candidate list, selecting a disparity motion vector predictor from one of a plurality of blocks in the candidate list, and encoding the disparity motion vector based on the disparity motion vector predictor.

In another example, a device for encoding video data includes a video encoder configured to encode a current block of video data, within a containing block, using a disparity motion vector, based on a determination that a neighboring block to the current block is also within the containing block, substitute a block outside the containing block and that neighbors the containing block for the neighboring block in a candidate list, select a disparity motion vector predictor from one of a plurality of blocks in the candidate list, and encode the disparity motion vector based on the disparity motion vector predictor.

The details of one or more examples are set forth in the accompanying drawings and the description below. Other features, objects, and advantages will be apparent from the description and drawings, and from the claims.

DETAILED DESCRIPTION

Figure 1:
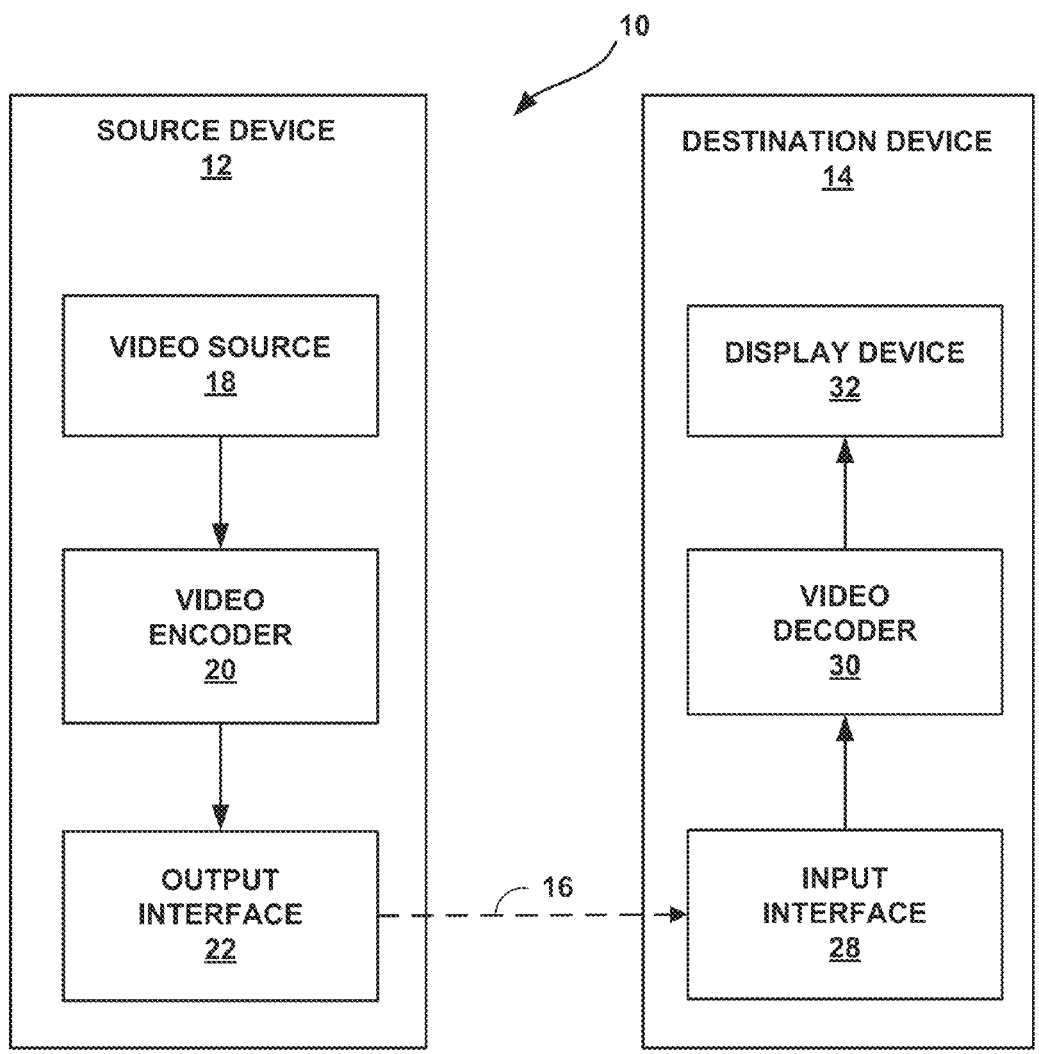
FIG. 1 is a block diagram illustrating an example video encoding and decoding system that may utilize techniques for generating disparity vectors for inter-view prediction.

In general, in video coding, video coders predictively code pictures in a sequence using either spatial prediction (or intra-prediction) or temporal prediction (or inter-prediction). To achieve a three-dimensional (3D) effect, two (or more) pictures may be presented substantially simultaneously, such that different pictures from different views are perceived by each of a viewer's eyes. Pictures in a sequence corresponding to a particular camera angle or horizontal camera position refer to a view of 3D video data. In 3D video coding, pictures may be inter-view predicted, in addition or in the alternative to temporal prediction.

There is an ongoing video coding standardization effort for High-Efficiency Video Coding (HEVC) in the Joint Collaborative Team on Video Coding (JCT-VC) of the ISO/IEC Moving Picture Experts Group (MPEG) and the ITU-T Video Coding Experts Group (VCEG). A working draft of HEVC is described in JCTVC-H1003, "High efficiency video coding (HEVC) text specification draft 6," 8th Meeting: San Jose, Calif., USA, February, 2012, available at http://phenix.int-evry.fr/jct/doc_end_user/documents/8_San%20Jose/wg11/JCTVC-H1003-v22.zip.

The techniques of this disclosure are generally related to HEVC-based 3D video coding, also referred to as 3DV. In particular, this disclosure provides techniques for enabling a view synthesis mode in 3DV. As explained in greater detail below, in HEVC, video coders, such as video encoders and video decoders, code pictures using block-based units referred to as coding units (CUs). CUs may be coded using various coding modes.

In one coding mode, referred to as disparity-compensated prediction (DCP), a block of video data (such as a CU or a prediction unit (PU) of a CU) may be predicted using a disparity vector. The disparity vector may identify a closely-matching block in a different view from the same temporal instance as a picture including the current CU. "Disparity" generally refers to a horizontal offset of two blocks of essentially the same object in a scene caused by horizontal offset of camera perspectives when capturing or generating images of the object. A disparity vector generally corresponds to a vector used to code a CU or PU of the CU relative to a picture in a different view.

Conventional HEVC techniques for performing disparity vector construction have encountered certain problems. For example, when a motion estimation region (MER) is used, spatial neighboring blocks used to get a spatial disparity vector might be unavailable due to those blocks being in the same MER. In this case, the final disparity vector may either be unavailable or less accurate. Also, some inter-view prediction techniques, e.g., residual prediction, are done at the CU level, while some of the inter-view prediction technique, e.g., motion prediction, are done at the PU level. So, disparity vector generation may need to be done multiple times due to different inter-view prediction techniques that are applied to different levels of block units. A MER may be referred to as a containing block when the MER includes a CU or PU for which disparity motion vector prediction is being performed, while a CU may be referred to as a containing block when the CU includes a PU for which disparity motion vector prediction is being performed.

Moreover, even though the disparity vector construction might be needed for each PU, the temporal disparity vectors of this PU may be similar to those of the other PUs in the same CU. Furthermore, when checking temporal disparity vectors, a large number of the PUs may be checked. Even when blocks of an inter-view reference picture can be considered as temporal, the motion vectors are not necessarily compressed as 16×16 block units.

The techniques of this disclosure aim to overcome one or more of these problems. These techniques may simplify and unify the current disparity vector generation techniques. In some examples, when an MER is used and the MER is larger than a PU, inter-view prediction for a PU may be based on spatial disparity vectors of blocks neighboring the current MER. In some examples, even when inter-view prediction is done at the PU level, disparity vector generation can be done for the CU containing a PU. In some examples, to generate a more accurate disparity vector for a PU, the disparity vector generated at the CU level may be refined. The refinement may happen by only further checking the spatial neighboring blocks of a CU containing the current PU. Alternatively or additionally, the refinement may happen by only further checking the spatial neighboring blocks of a MER containing the current PU. Alternatively or additionally, the refinement may happen by only further checking the spatial neighboring blocks of the current PU.

FIG. 1 is a block diagram illustrating an example video encoding and decoding system 10 that may utilize techniques for generating disparity vectors for inter-view prediction. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for generating disparity vectors for inter-view prediction. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for generating disparity vectors for inter-view prediction may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

The ITU-T H.264/MPEG-4 (AVC) standard was formulated by the ITU-T Video Coding Experts Group (VCEG) together with the ISO/IEC Moving Picture Experts Group (MPEG) as the product of a collective partnership known as the Joint Video Team (JVT). In some aspects, the techniques described in this disclosure may be applied to devices that generally conform to the H.264 standard. The H.264 standard is described in ITU-T Recommendation H.264, Advanced Video Coding for generic audiovisual services, by the ITU-T Study Group, and dated March, 2005, which may be referred to herein as the H.264 standard or H.264 specification, or the H.264/AVC standard or specification. The Joint Video Team (JVT) continues to work on extensions to H.264/MPEG-4 AVC.

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU), also referred to as "coding tree units" or "CTUs," that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units.

Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up", "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 and video decoder 30 may be configured to perform any or all of the techniques of this disclosure. For instance, video encoder 20 and video decoder 30 may be configured to code video data in parallel using a motion estimation region (MER). In accordance with the techniques of this disclosure, when video encoder 20 and video decoder 30 use a MER that is larger than a PU currently being coded, video encoder 20 and video decoder 30 may be configured to perform inter-view prediction for the PU based on spatial disparity vectors of blocks neighboring the current MER, rather than blocks within the MER. Examples of such techniques are described in greater detail below with respect to FIGS. 8-10.

Additionally or alternatively, when video encoder 20 and video decoder 30 are configured to perform inter-view prediction at the PU level, video encoder 20 and video decoder 30 may nevertheless perform disparity vector generation for the CU containing a PU. Examples of such techniques are described in greater detail below with respect to FIG. 11. Likewise, video encoder 20 and video decoder 30 may be configured to refine a disparity vector generated at the CU level, to produce a more accurate disparity vector for the PU. For instance, video encoder 20 and video decoder 30 may check spatial neighboring blocks of a CU containing the current PU, for refinement. As another example, video encoder 20 and video decoder 30 may check the spatial neighboring blocks of a MER containing the current PU, for refinement. As yet another example, video encoder 20 and video decoder 30 may check the spatial neighboring blocks of the current PU, for refinement.

Thus, video encoder 20 may be configured to encode a current block of video data, within a containing block, using a disparity motion vector. For instance, video encoder 20 may determine that encoding the current block using inter-view prediction yields the best, or at least acceptable, rate-distortion optimization (RDO) characteristics. Moreover, the current block may occur within a containing block, such as a motion estimation region (MER). Alternatively, the current block may comprise a PU that occurs within a CU.

In any case, based on a determination that a neighboring block to the current block is also within the containing block, video encoder 20 may substitute a block outside the containing block and that neighbors the containing block for the neighboring block in a candidate list. That is, for the purpose of performing motion vector encoding (e.g., disparity motion vector encoding, in the case of inter-view prediction), video encoder 20 may construct a candidate list, including a list of motion vector predictor candidates. In general, video encoder 20 may select motion vectors from spatial and/or temporal neighboring blocks to the current block as the candidate motion vector predictors to include in the list. In accordance with the techniques of this disclosure, video encoder 20 may substitute motion vectors of blocks outside the containing block for motion vectors of blocks within the containing block, to allow for parallel encoding (and likewise, parallel decoding) of video data within the containing block.

Video encoder 20 may then select a disparity motion vector predictor from one of a plurality of blocks in the candidate list. For instance, video encoder 20 may select one of the candidate motion vector predictors in the list that most closely matches the disparity motion vector for the current block (e.g., as determined by vector difference calculations). Video encoder 20 may then encode the disparity motion vector based on the disparity motion vector predictor. For instance, video encoder 20 may encode the disparity motion vector using merge mode or advanced motion vector prediction (AMVP) techniques.

In merge mode, video encoder 20 may signal a merge index value that identifies the neighboring block from which motion information is to be retrieved, to cause video decoder 30 to use the motion information of that neighboring block as motion information for the current block. In accordance with the techniques of this disclosure, if the signaled neighboring block is outside the containing block, such signaling may prompt video decoder 30 to retrieve the motion information for the substituted block to use as the motion information for the current block. The motion information inherited from the block corresponding to the merge index may further include a reference picture list and reference picture index corresponding to the reference picture. To utilize a high-level syntax (HLS)-only extension to HEVC, video encoder 20 may be configured to signal inter-view reference pictures as long-term reference pictures, and intra-view reference pictures as short-term reference pictures, in which case the reference picture index and reference picture list signaling may remain substantially the same, or identical to, the techniques of HEVC for single view coding.

In AMVP, video encoder 20 may signal an AMVP index that identifies the neighboring block from which motion information is to be retrieved, which may correspond to a neighboring block in substantially the same manner as the merge index for merge mode. However, video encoder 20 may additionally encode a motion vector difference value, representing the difference between the disparity motion vector and the motion vector predictor of the block corresponding to the AMVP index. In accordance with the techniques of this disclosure, when the AMVP index corresponds to a neighboring block to the current block that is also within the containing block, motion information defining a motion vector predictor may actually be retrieved from a block outside the containing block. Video encoder 20 may also signal data representative of the reference picture list and reference index. Moreover, video decoder 30 may encode the current block using the disparity motion vector.

Accordingly, video decoder 30 may be configured to perform a substantially reciprocal technique to that of video encoder 20. For instance, video decoder 30 may be configured to determine that a current block of video data is encoded using a disparity motion vector, wherein the current block is within a containing block, based on a determination that a neighboring block to the current block is also within the containing block, substitute a block outside the containing block and that neighbors the containing block for the neighboring block in a candidate list, select a disparity motion vector predictor from one of a plurality of blocks in the candidate list, and decode the disparity motion vector based on the disparity motion vector predictor.

For example, video decoder 30 may receive signaling data indicating that the current block is encoded using the disparity motion vector. Video decoder 30 may further determine a position of the current block within the containing block, as well as positions of neighboring blocks to the current block, to determine whether to add the neighboring blocks or blocks outside the containing block and neighboring the containing block to a candidate list.

Video decoder 30 may receive an identifier (e.g., a merge index or AMVP index) identifying which of the neighboring blocks to use to decode the disparity motion vector. In accordance with the techniques of this disclosure, if the signaled neighboring block is within the containing block that contains the current block, video decoder 30 may actually retrieve motion information from a neighboring block to the containing block that is outside the containing block. Video decoder 30 may then decode the disparity motion vector using the motion vector predictor retrieved from the block corresponding to the identifier. Likewise, video decoder 30 may decode the current block using the disparity motion vector.

Video encoder 20 and video decoder 30 each may be implemented as any of a variety of suitable encoder or decoder circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 20 and video decoder 30 may be included in one or more encoders or decoders, either of which may be integrated as part of a combined video encoder/decoder (CODEC). A device including video encoder 20 and/or video decoder 30 may comprise an integrated circuit, a microprocessor, and/or a wireless communication device, such as a cellular telephone.

Figure 2:
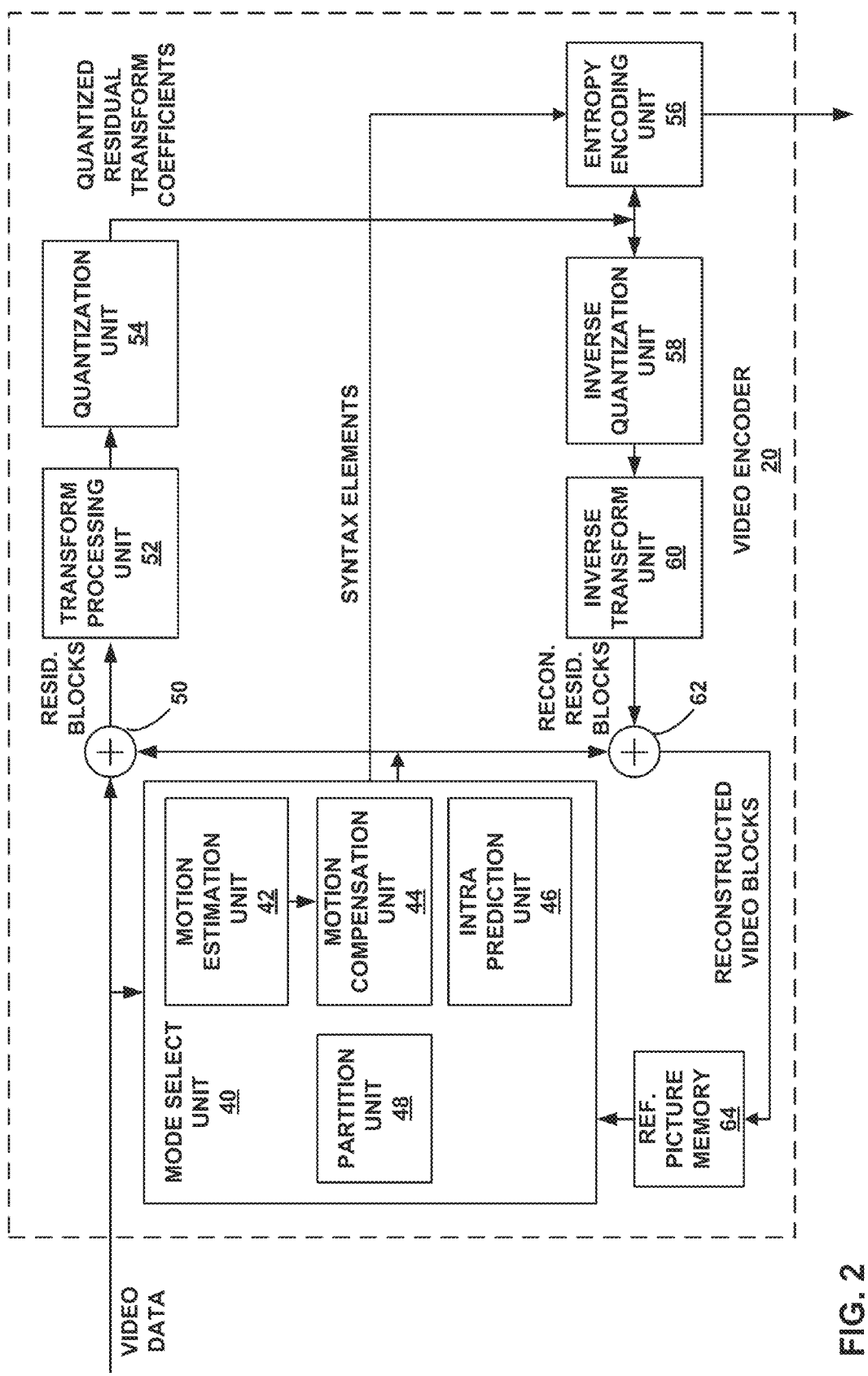
FIG. 2 is a block diagram illustrating an example of a video encoder that may implement techniques for generating disparity vectors for inter-view prediction.

FIG. 2 is a block diagram illustrating an example of video encoder 20 that may implement techniques for generating disparity vectors for inter-view prediction. Video encoder 20 may perform temporal intra-coding, temporal inter-coding, and inter-view coding, of video blocks within video slices. Temporal intra-coding relies on spatial prediction to reduce or remove spatial redundancy in video within a given video frame or picture. Temporal inter-coding relies on temporal prediction to reduce or remove temporal redundancy in video within adjacent frames or pictures of a video sequence. Inter-view coding relies on inter-view prediction to reduce or remove redundancy in pictures from another view that may be shifted horizontally in perspective. Temporal intra-mode (I mode) may refer to any of several spatial based coding modes. Temporal inter-modes, such as uni-directional prediction (P mode) or bi-prediction (B mode), may refer to any of several temporal-based coding modes. Inter-view modes may refer to the use of a disparity motion vector or other such inter-view coding techniques. In general, inter-view prediction may be performed in a manner that is substantially similar to temporal inter-coding.

As shown in FIG. 2, video encoder 20 receives a current video block within a video frame to be encoded. In the example of FIG. 2, video encoder 20 includes mode select unit 40, reference picture memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding (whether temporal or inter-view) of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, (temporal intra-coding, temporal inter-coding, or inter-view coding), e.g., based on error results, and provides the resulting intra- or inter-coded (temporal or inter-view) block to summer 50 to generate residual block data and to summer 62 to reconstruct the encoded block for use as a reference frame. Mode select unit 40 also provides syntax elements, such as motion vectors (e.g., temporal motion vectors or disparity motion vectors), intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A disparity motion vector generally represents a horizontal shift, i.e., disparity, between two blocks of corresponding pictures from different views, resulting from slightly different camera perspectives for the different views. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference picture memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded (temporal or inter-view) slice by comparing the position of the PU to the position of a predictive block of a reference picture. The reference picture may be selected from a first reference picture list (List 0) or a second reference picture list (List 1), each of which identify one or more reference pictures stored in reference picture memory 64. In some examples, inter-view reference pictures may be signaled as long-term reference pictures, while temporal reference pictures may be signaled as short-term reference pictures. Alternatively, inter-view reference pictures may be signaled as short-term reference pictures, while temporal reference pictures may be signaled as long-term reference pictures. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

In addition, video encoder 20 may encode the motion vector, e.g., using one of merge mode or AMVP. In accordance with the techniques of this disclosure, where the current block is contained within a containing block (e.g., a MER), video encoder 20 may apply the motion vector of a neighboring block to the containing block to the current block when a neighboring block to the current block is within the containing block, assuming that the containing block defines a region that is capable of being coded in parallel. That is, when the current block is within a containing block, and when a block that neighbors the current block is also within the containing block, video encoder 20 may substitute a block outside the containing block, and neighboring the containing block, for the neighboring block to the current block, for the purposes of motion vector coding.

For purposes of explanation of motion vector coding techniques in accordance with this disclosure, the term "neighboring block" should be understood to refer to a block that neighbors the current block when the neighboring block is outside of a containing block that contains the current block, but should be understood to refer to a block that neighbors, and is outside of, the containing block when an otherwise neighboring block is within the containing block. In merge mode, video encoder 20 may apply the motion vector of a neighboring block to the current block (e.g., the current PU). In AMVP mode, video encoder 20 may calculate a motion vector difference between the motion vector for the current block and the motion vector of the neighboring block, and entropy encoding unit 56 may encode data representative of the motion vector difference. Moreover, in merge mode, entropy encoding unit 56 may encode data defining a merge index that identifies the neighboring block, while in AMVP, entropy encoding unit 56 may encode data defining an AMVP index that identifies the neighboring block. The merge index and AMVP index represent examples of neighboring block identifiers.

Figure 5:
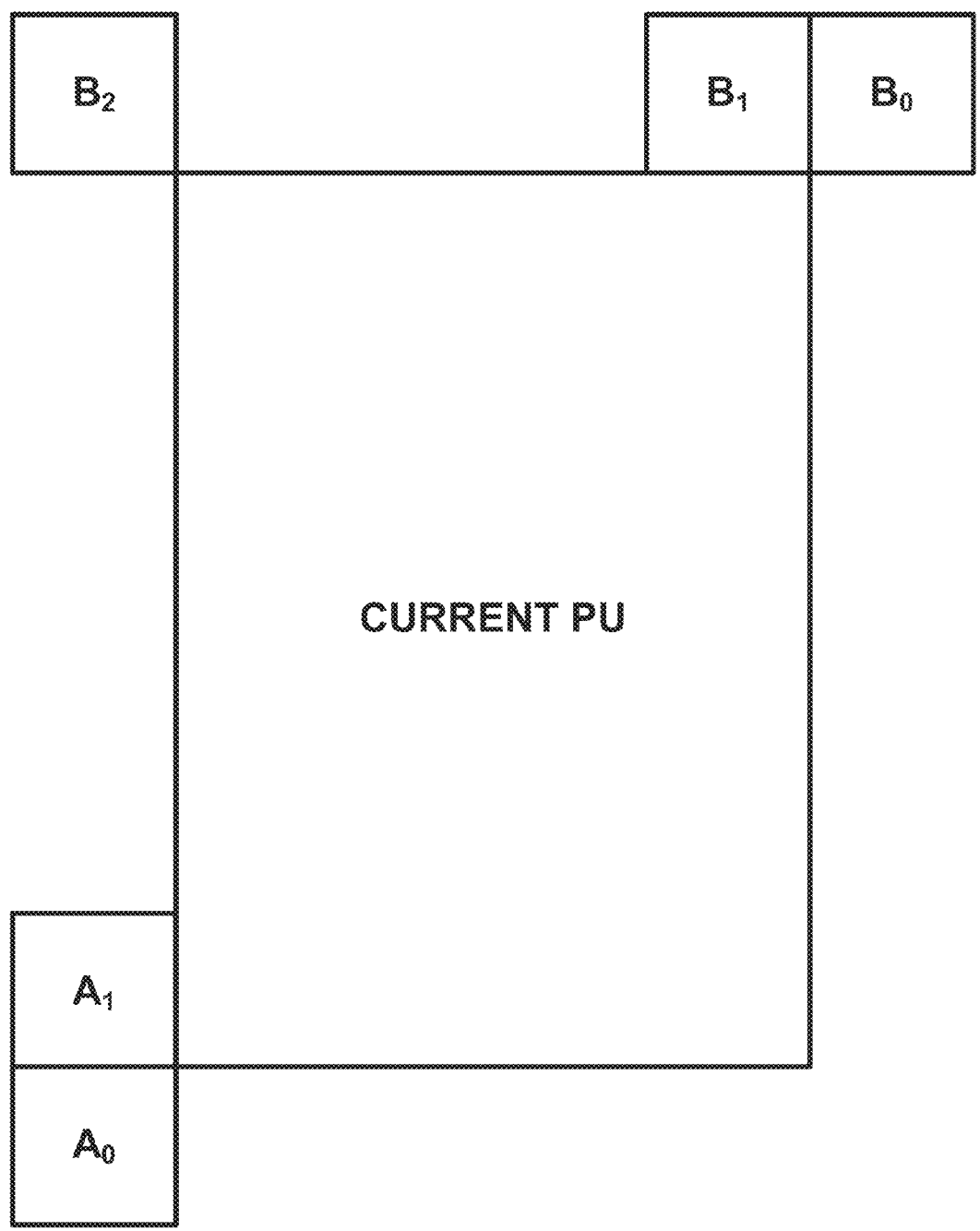
FIG. 5 is a block diagram illustrating an example of a current prediction unit (PU) and spatially neighboring blocks $A_0$, $A_1$, $B_0$, $B_1$, and $B_2$.

More particularly, video encoder 20 may construct a candidate list, including identifiers for one or more spatial neighbors to the current block (e.g., the current PU). Examples of the spatial neighbors are shown in FIG. 5 below. However, assuming that the current block is within a containing block (and that the containing block defines a region that allows for parallel coding), video encoder 20 may determine substitutes for any of the neighboring blocks to the current block that are also within the containing block. Examples of substitution schemes are shown in FIGS. 8-11.

In general, video encoder 20 may substitute a block outside the containing block that is similarly positioned as the neighboring block to the current block that is within the containing block. For instance, in some examples, if the neighboring block within the containing block is at a particular corner of the current block, the substituted block may be at the same corner of the containing block. As another example, if the neighboring block is on the left side of the current block, the substituted block may have the same vertical position but a horizontal position that places the substituted block outside of, but next to, the containing block. Similarly, if the neighboring block is on the top side of the current block, the substituted block may have the same horizontal position but a vertical position that places the substituted block outside of, but next to, the containing block. Video encoder 20 may encode data representative of a neighboring block outside the containing block as if the neighboring block were within the containing block and neighboring the current block. As discussed below with respect to FIG. 3, however, video decoder 30 may be configured to determine that the coded data corresponds to a neighboring block outside of the containing block when the neighboring block would otherwise be within the containing block.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms that are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference picture memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference picture memory 64. The reconstructed video block may be used by motion estimation unit 42 and motion compensation unit 44 as a reference block to inter-code a block in a subsequent video frame.

Video encoder 20 of FIG. 2 represents an example of a video encoder configured to encode a current block of video data, within a containing block, using a disparity motion vector, based on a determination that a neighboring block to the current block is also within the containing block, substitute a block outside the containing block and that neighbors the containing block for the neighboring block in a candidate list, select a disparity motion vector predictor from one of a plurality of blocks in the candidate list, and encode the disparity motion vector based on the disparity motion vector predictor.

Figure 3:
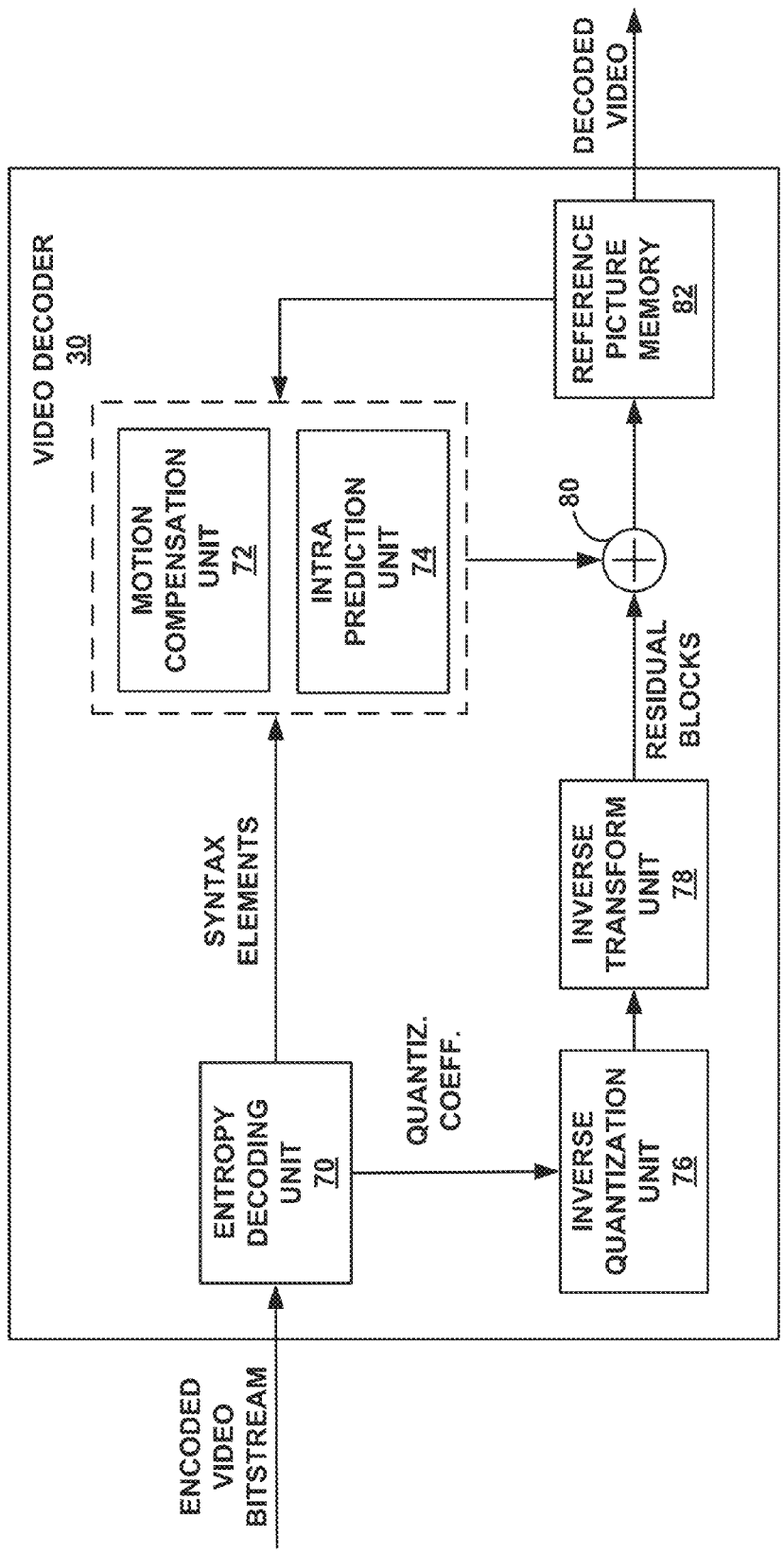
FIG. 3 is a block diagram illustrating an example of a video decoder that may implement techniques for generating disparity vectors for inter-view prediction.

FIG. 3 is a block diagram illustrating an example of video decoder 30 that may implement techniques for generating disparity vectors for inter-view prediction. In the example of FIG. 3, video decoder 30 includes an entropy decoding unit 70, motion compensation unit 72, intra prediction unit 74, inverse quantization unit 76, inverse transformation unit 78, reference picture memory 82 and summer 80. Video decoder 30 may, in some examples, perform a decoding pass generally reciprocal to the encoding pass described with respect to video encoder 20 (FIG. 2). Motion compensation unit 72 may generate prediction data based on temporal or disparity motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors (temporal and/or disparity) and other syntax elements related to inter-prediction (temporal or inter-view) to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (i.e., temporal B, temporal P, or inter-view) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference picture memory 82.

Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra-prediction, temporal inter-prediction, or inter-view prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

In accordance with the techniques of this disclosure, motion compensation unit 72 may receive syntax elements indicative of how to reproduce motion information for a current block. Motion compensation unit 72 may receive one or more syntax elements indicative of an identifier of a spatial or temporal neighboring block from which to retrieve motion information used to decode motion information for the current block. Such syntax elements may include, for example, a merge index or an AMVP index. The current block may be within a containing block (e.g., where the current block may comprise a CU or PU within a MER or a PU within a CU), and the spatial neighboring block indicated by the syntax elements may correspond to a neighboring block to the current block that is also within the containing block.

In such a case, in accordance with the techniques of this disclosure, motion compensation unit 72 may substitute a neighboring block to the containing block, and outside the containing block, for the neighboring block to the current block indicated by an identifier (where the identifier may correspond to one of the syntax elements, e.g., a merge index or an AMVP index). For instance, if the identifier corresponds to a neighboring block at a corner of the current block, motion compensation unit 72 may substitute a block at a corresponding corner of the containing block, e.g., as discussed below with respect to FIG. 8. Alternatively, if the identifier corresponds to a neighboring block at a corner of the current block, motion compensation unit 72 may substitute a block at a similar horizontal or vertical position, but shifted vertically or horizontally to be outside of the current block, e.g., as discussed below with respect to FIG. 10. In general, video decoder 30 may be configured to substitute such neighboring blocks to the current block with neighboring blocks to the containing block in the same manner as that used by video encoder 20, such that the motion information can be properly decoded.

More particularly, motion compensation unit 72 may assemble a candidate list including one or more candidate neighboring blocks (spatial or temporal) from which motion information may be retrieved. In accordance with the techniques of this disclosure, video decoder 30 may substitute neighboring blocks to the current block with neighboring blocks to the containing block, in the candidate list, when the neighboring blocks to the current block are within the containing block that contains the current block. The identifier that identifies the block from which to retrieve predictive motion information (e.g., a merge index or an AMVP index) may correspond to an entry in the candidate list.

The containing block may define a parallel decoding region. By predicting motion information for the current block using data outside the containing block (e.g., using a merge mode or an AMVP mode), information within the containing block need not be decoded prior to decoding motion information for the current block. In this manner, motion compensation unit 72 may decode motion information for two or more blocks within the containing block. Accordingly, the containing block may be said to define a parallel decoding region. In other words, the techniques of this disclosure may allow video decoder 30 to decode data within the containing block in parallel, which may allow for substantially simultaneous decoding of two or more blocks within the containing block.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, i.e., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied. Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference picture memory 82, which stores reference pictures used for subsequent motion compensation. Reference picture memory 82 also stores decoded video for later presentation on a display device, such as display device 32 of FIG. 1.

In this manner, video decoder 30 of FIG. 3 represents an example of a video decoder configured to determine that a current block of video data is encoded using a disparity motion vector, wherein the current block is within a containing block, based on a determination that a neighboring block to the current block is also within the containing block, substitute a block outside the containing block and that neighbors the containing block for the neighboring block in a candidate list, select a disparity motion vector predictor from one of a plurality of blocks in the candidate list, and decode the disparity motion vector based on the disparity motion vector predictor.

Figure 4:
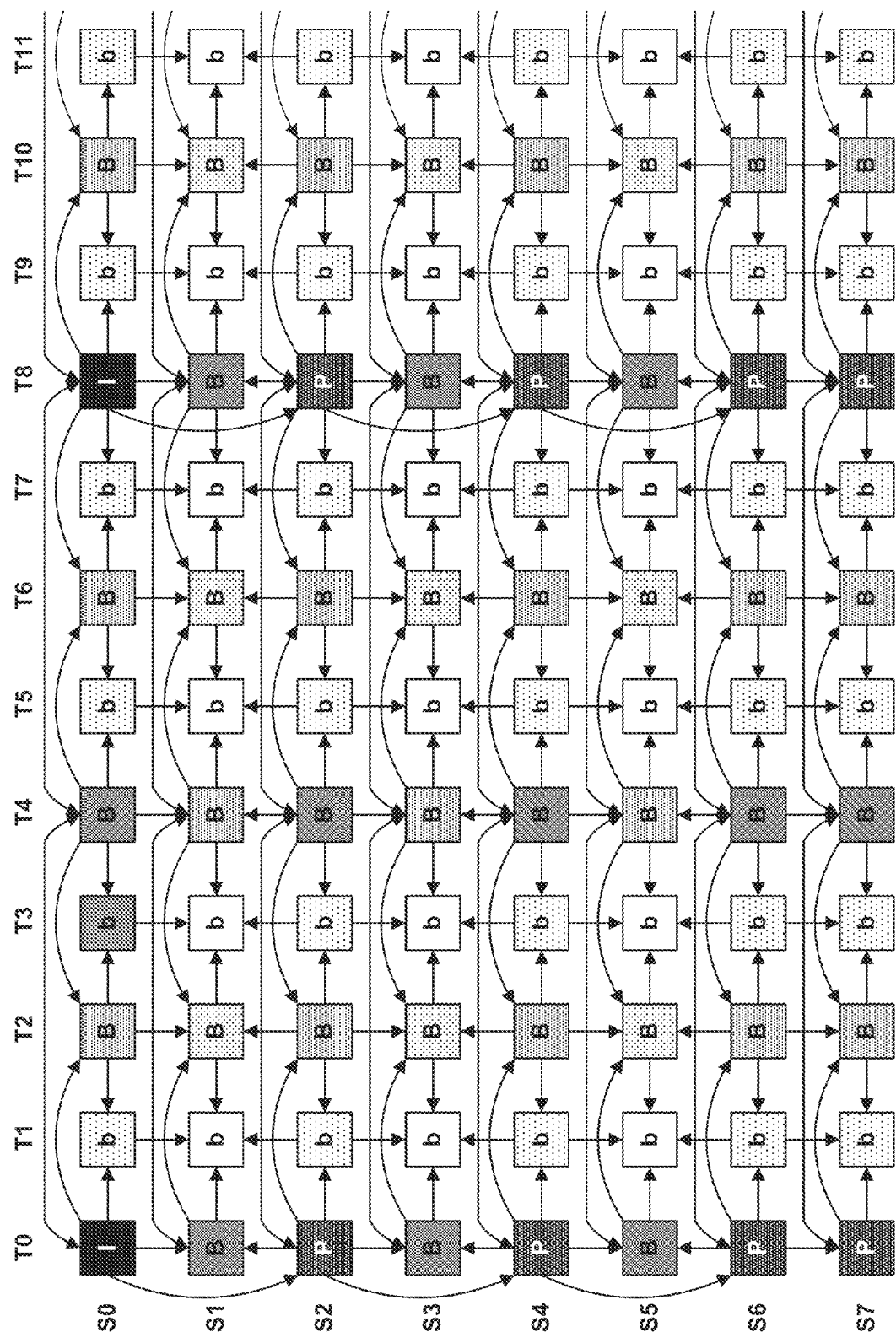
FIG. 4 is a conceptual diagram illustrating an example multiview video coding (MVC) prediction pattern.

FIG. 4 is a conceptual diagram illustrating an example MVC prediction pattern. Multi-view video coding (MVC) is an extension of ITU-T H.264/AVC. A similar technique may be applied to HEVC. In the example of FIG. 4, eight views (having view IDs "S0" through "S7") are illustrated, and twelve temporal locations ("T0" through "T11") are illustrated for each view. That is, each row in FIG. 4 corresponds to a view, while each column indicates a temporal location.

Although MVC has a so-called base view which is decodable by H.264/AVC decoders and stereo view pair could be supported also by MVC, one advantage of MVC is that it could support an example that uses more than two views as a 3D video input and decodes this 3D video represented by the multiple views. A renderer of a client having an MVC decoder may expect 3D video content with multiple views.

A typical MVC decoding order is referred to as time-first coding. An access unit may include coded pictures of all views for one output time instance. For example, each of the pictures of time T0 may be included in a common access unit, each of the pictures of time T1 may be included in a second, common access unit, and so on. The decoding order is not necessarily identical to the output or display order.

Frames in FIG. 4 are indicated at the intersection of each row and each column in FIG. 4 using a shaded block including a letter, designating whether the corresponding frame is intra-coded (that is, an I-frame), or inter-coded in one direction (that is, as a P-frame) or in multiple directions (that is, as a B-frame). In general, predictions are indicated by arrows, where the pointed-to frame uses the pointed-from object for prediction reference. For example, the P-frame of view S2 at temporal location T0 is predicted from the I-frame of view S0 at temporal location T0.

As with single view video encoding, frames of a multi-view video coding video sequence may be predictively encoded with respect to frames at different temporal locations. For example, the b-frame of view S0 at temporal location T1 has an arrow pointed to it from the I-frame of view S0 at temporal location T0, indicating that the b-frame is predicted from the I-frame. Additionally, however, in the context of multiview video encoding, frames may be inter-view predicted. That is, a view component can use the view components in other views for reference. In MVC, for example, inter-view prediction is realized as if the view component in another view is an inter-prediction reference. The potential inter-view references are signaled in the Sequence Parameter Set (SPS) MVC extension and can be modified by the reference picture list construction process, which enables flexible ordering of the inter-prediction or inter-view prediction references.

In the MVC extension of H.264/AVC, as an example, inter-view prediction is supported by disparity motion compensation, which uses the syntax of the H.264/AVC motion compensation, but allows a picture in a different view to be used as a reference picture. Coding of two views can be supported by MVC, which is generally referred to as stereoscopic views. One of the advantages of MVC is that an MVC encoder could take more than two views as a 3D video input and an MVC decoder can decode such a multiview representation. So a rendering device with an MVC decoder may expect 3D video contents with more than two views.

In MVC, inter-view prediction (IVP) is allowed among pictures in the same access unit (that is, with the same time instance). An access unit is, generally, a unit of data including all view components (e.g., all NAL units) for a common temporal instance. Thus, in MVC, inter-view prediction is permitted among pictures in the same access unit. When coding a picture in one of the non-base views, the picture may be added into a reference picture list, if it is in a different view but with the same time instance (e.g., the same POC value, and thus, in the same access unit). An inter-view prediction reference picture may be put in any position of a reference picture list, just like any inter prediction reference picture.

In the context of multi-view video coding, there are two kinds of motion vectors. One is normal motion vectors pointing to temporal reference pictures, and the corresponding inter prediction mode is referred to as motion compensated prediction (MCP). The other is disparity motion vectors pointing to pictures in a different view, and the corresponding inter-view prediction mode is referred to as disparity-compensated prediction (DCP).

In conventional HEVC, there are two modes for the prediction of motion parameters: one is merge mode, and the other is advanced motion vector prediction (AMVP). In the merge mode, a candidate list of motion parameters (reference pictures, and motion vectors) is constructed where the candidate can be from spatial or temporal neighboring blocks. The spatially and temporally neighboring blocks may form a candidate list, that is, a set of candidates from which motion prediction information may be selected. Accordingly, the motion parameters chosen as motion prediction information may be signaled by coding an index into the candidate list. At the decoder side, once the index is decoded, all the motion parameters of the corresponding block where the index points to may be inherited, in merge mode.

In AMVP, accordingly conventional HEVC, a candidate list of motion vector predictors for each motion hypothesis is derived based on the coded reference index. This list includes motion vectors of neighboring blocks that are associated with the same reference index as well as a temporal motion vector predictor which is derived based on the motion parameters of the neighboring block of the co-located block in a temporal reference picture. The chosen motion vectors are signaled by transmitting an index into the candidate list. In addition, the reference index values and motion vector differences are also signaled.

In addition, two motion data compression methods are defined in HEVC. These methods are described in greater detail with respect to FIG. 6 below.

FIG. 4 provides various examples of inter-view prediction. Frames of view S1, in the example of FIG. 4, are illustrated as being predicted from frames at different temporal locations of view S1, as well as inter-view predicted from frames of frames of views S0 and S2 at the same temporal locations. For example, the b-frame of view S1 at temporal location T1 is predicted from each of the B-frames of view S1 at temporal locations T0 and T2, as well as the b-frames of views S0 and S2 at temporal location T1.

In the example of FIG. 4, capital "B" and lowercase "b" are intended to indicate different hierarchical relationships between frames, rather than different encoding methodologies. In general, capital "B" frames are relatively higher in the prediction hierarchy than lowercase "b" frames. FIG. 4 also illustrates variations in the prediction hierarchy using different levels of shading, where a greater amount of shading (that is, relatively darker) frames are higher in the prediction hierarchy than those frames having less shading (that is, relatively lighter). For example, all I-frames in FIG. 4 are illustrated with full shading, while P-frames have a somewhat lighter shading, and B-frames (and lowercase b-frames) have various levels of shading relative to each other, but always lighter than the shading of the P-frames and the I-frames.

In general, the prediction hierarchy is related to view order indexes, in that frames relatively higher in the prediction hierarchy should be decoded before decoding frames that are relatively lower in the hierarchy, such that those frames relatively higher in the hierarchy can be used as reference frames during decoding of the frames relatively lower in the hierarchy. A view order index is an index that indicates the decoding order of view components in an access unit. The view order indices are implied in the SPS MVC extension, as specified in Annex H of H.264/AVC (the MVC amendment). In the SPS, for each index i, the corresponding view_id is signaled. In some examples, the decoding of the view components shall follow the ascending order of the view order index. If all the views are presented, then the view order indexes are in a consecutive order from 0 to num_views_minus_1.

In this manner, frames used as reference frames may be decoded before decoding the frames that are encoded with reference to the reference frames. A view order index is an index that indicates the decoding order of view components in an access unit. For each view order index i, the corresponding view_id is signaled. The decoding of the view components follows the ascending order of the view order indexes. If all the views are presented, then the set of view order indexes may comprise a consecutively ordered set from zero to one less than the full number of views.

For certain frames at equal levels of the hierarchy, decoding order may not matter relative to each other. For example, the I-frame of view S0 at temporal location T0 is used as a reference frame for the P-frame of view S2 at temporal location T0, which is in turn used as a reference frame for the P-frame of view S4 at temporal location T0. Accordingly, the I-frame of view S0 at temporal location T0 should be decoded before the P-frame of view S2 at temporal location T0, which should be decoded before the P-frame of view S4 at temporal location T0. However, between views S1 and S3, a decoding order does not matter, because views S1 and S3 do not rely on each other for prediction, but instead are predicted only from views that are higher in the prediction hierarchy. Moreover, view S1 may be decoded before view S4, so long as view S1 is decoded after views S0 and S2.

In this manner, a hierarchical ordering may be used to describe views S0 through S7. Let the notation SA>SB mean that view SA should be decoded before view SB. Using this notation, S0>S2>S4>S6>S7, in the example of FIG. 4. Also, with respect to the example of FIG. 4, S0>S1, S2>S1, S2>S3, S4>S3, S4>S5, and S6>S5. Any decoding order for the views that does not violate these requirements is possible. Accordingly, many different decoding orders are possible, with only certain limitations.

In accordance with the techniques of this disclosure, video encoder 20 and video decoder 30 may be configured to code data within a block (e.g., a containing block) in parallel. To accomplish this, video encoder 20 and video decoder 30 may be configured not to use data within the containing block to predict other data within the containing block. For instance, video encoder 20 and video decoder 30 may be configured to code motion information of a current block, within a containing block, using predictive motion information from blocks outside the current block. Thus, video encoder 20 and video decoder 30 may substitute motion prediction candidates for coding, e.g., temporal and/or disparity motion vectors. In this manner, video encoder 20 and video decoder 30 may use the techniques of this disclosure to encode temporal and/or disparity motion vectors of, e.g., FIG. 4.

FIG. 5 is a block diagram illustrating an example of a current PU and spatially neighboring blocks $A_0$, $A_1$, $B_0$, $B_1$, and $B_2$. FIG. 5 depicts a relationship between a current PU and its spatially neighboring PUs. For purposes of this discussion, the following symbols are defined:

A luma location (xP, yP) (that is, in the luminance component) may be used to specify the top-left luma sample of the current PU relative to the top-left sample of the current picture.

Variables nPSW and nPSH may denote the width and the height of the current PU for luma, that is, in the luminance component.

In this example, the top-left luma sample of the current prediction unit N relative to the top-left sample of the current picture is (xN, yN). Then (xN, yN) (with N being replaced by $A_0$, $A_1$, $B_0$, $B_1$ or $B_2$) may be defined as (xP−1, yP+nPSH), (xP−1, yP+nPSH−1), (xP+nPSW, yP−1), (xP+nPSW−1, yP−1) or (xP−1, yP−1), respectively.

As noted above, in some examples, a video coder, such as video encoder 20 or video decoder 30, may perform temporal motion vector prediction. That is, a motion vector for a current PU may be coded relative to a temporal motion vector predictor (TMVP). To get a TMVP, firstly, a video coder may identify a co-located picture (e.g., a picture within the same access unit as the current picture). If a slice of the current picture is a B slice, a collocated_from_l0_flag may be signaled in slice header to indicate whether the co-located picture is from RefPicList0 or RefPicList1.

In addition, for a B slice, a combined list (RefPicListC) may be constructed after the final reference picture lists (RefPicList0 and RefPicList1) have been constructed. The combined list can further be modified if reference picture list modification syntax is present for the combined list.

After a reference picture list is identified, collocated_ref_idx, signaled in slice header, may be used to identify the picture in the picture in the list. A co-located PU may then be identified by checking the co-located picture. Either the motion of the right-bottom PU of the CU containing this PU, or the motion of the right-bottom PU within the center PUs of the CU containing this PU, may be used.

When motion vectors identified by the above process are used to generate a motion candidate for AMVP or merge mode, they may be scaled based on the temporal location (reflected by picture order count (POC) values for the pictures). In HEVC, a picture parameter set (PPS) includes a flag enable_temporal_mvp_flag. When a particular picture with temporal_id equal to 0 refers to a PPS having enable_temporal_mvp_flag equal to 0, all the reference pictures in the DPB may be marked as "unused for temporal motion vector prediction," and no motion vector from pictures before that particular picture in decoding order would be used as a temporal motion vector predictor in decoding of the particular picture or a picture after the particular picture in decoding order.

Figure 6:
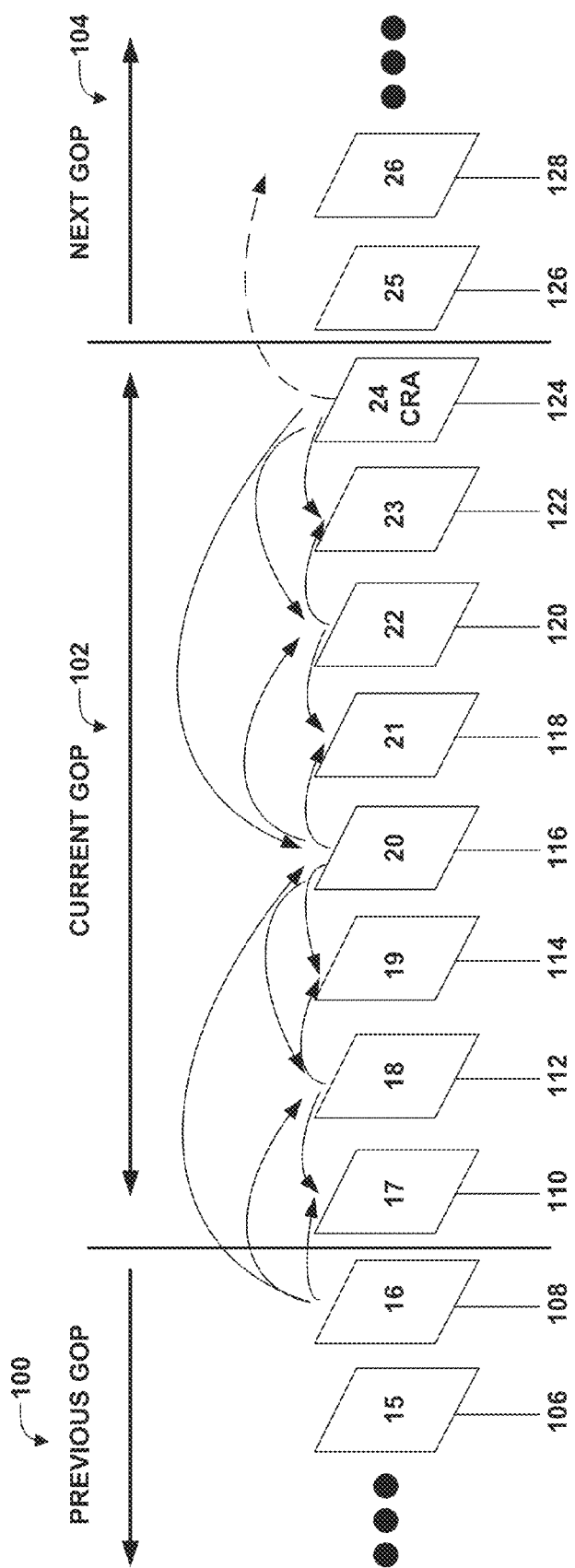
FIG. 6 is a conceptual diagram illustrating pictures of various groups of pictures (GOPs), where the pictures are of different types.

FIG. 6 is a conceptual diagram illustrating pictures of various groups of pictures (GOPs), where the pictures are of different types. In particular FIG. 6 shows a previous GOP 100, a current GOP 102, and a next GOP 104. Previous GOP 100 includes pictures 106, 108. Current GOP 102 includes pictures 110-124 (where picture 124 represents an example of a clean random access picture (CRA) in the example of FIG. 6). Next GOP 104 includes pictures 126, 128.

Each of pictures 106-128 includes a numeric value representative of the POC value of the corresponding picture. It should be noted that a decoding order may differ from the display order as indicated by POC values. Arrows in FIG. 6 represent potential predictions. In particular, the picture to which an arrow points may be used as a reference picture by the picture from which the arrow is pointing. For example, picture 108 (with POC value 16) may be used as a reference picture for predicting picture 116 (with POC value 20).

In HEVC, there are four picture types that can be identified by network abstraction layer (NAL) unit type. These are the instantaneous decoding refresh (IDR) picture, the clean random access (CRA) picture, the temporal layer access (TLA) picture, and the coded picture that is not an IDR, CRA or TLA picture. In this example, the picture with POC value 24 is a CRA picture.

The IDR and the coded pictures are picture types substantially inherited from the H.264/AVC specification. The CRA and the TLA picture types are new in HEVC and not available in the H.264/AVC specification. The CRA picture is a picture type that facilitates decoding beginning from any random access point in the middle of a video sequence that is more efficient than inserting IDR pictures. In HEVC, the bitstream starting from these CRA pictures are also conforming bitstreams. The TLA picture is a picture type that can be used to indicate valid temporal layer switching points.

In video applications, such as broadcasting and streaming (e.g., over a network, such as in accordance with Dynamic Adaptive Streaming over HTTP (DASH), Real-time Transport Protocol (RTP) or Real-Time Streaming Protocol (RTSP)), an important feature for users to switch between different channels and to jump to specific parts of the video with minimum delay is needed. This feature may be enabled by having random access pictures at regular intervals in the video bitstreams. The IDR picture, specified in both H.264/AVC and HEVC, can be used for random access. However, since an IDR picture starts a coded video sequence and always cleans the decoded picture buffer (DPB), pictures following the IDR in decoding order cannot use pictures decoded prior to the IDR picture as reference. Consequently, bitstreams relying on IDR pictures for random access can have significantly lower coding efficiency (e.g., 6%). To improve the coding efficiency, the CRA pictures in HEVC allows pictures that follow the CRA picture in decoding order but precede it in output order to use pictures decoded before the CRA picture as reference pictures.

An example prediction structure around a CRA picture (picture 124) is shown in FIG. 6. CRA picture 124 (with POC 24) belongs to current GOP 102, which contains other pictures 110-122 (having POC values 17 through 23), following CRA picture 124 in decoding order but preceding CRA picture 124 in output order. That is, because pictures 110-122 (having POC values 17 through 23) in the example of FIG. 6 may depend from picture 124, or from a picture that in turn depends from picture 124, picture 124 must be decoded prior to pictures 110-122. Pictures 110-122 are therefore called leading pictures of CRA picture 124 and can be correctly decoded if the decoding starts from an IDR or CRA picture before the current CRA picture. However, leading pictures cannot be correctly decoded when random access from CRA picture 124 occurs. That is, as shown in the example of FIG. 6, the leading pictures may depend from pictures earlier in the bitstream, such as picture 108. Hence, leading pictures 110-122 are typically discarded during random access decoding.

To prevent error propagation from reference pictures that may not be available depending on where the decoding starts, all pictures in next GOP 104 as shown in FIG. 6, that follow CRA picture 124 both in decoding order and output order, may be coded so as not to use any picture that precedes CRA picture 124 either in decoding order or output order (which includes leading pictures 110-122, having POC values 17-23) for reference.

Similar random access functionalities are supported in H.264/AVC with a recovery point SEI message. An H.264/AVC decoder implementation may or may not support the functionality. In HEVC, a bitstream starting with a CRA picture is considered as a conforming bitstream. When a bitstream starts with a CRA picture, the leading pictures of the CRA picture may refer to unavailable reference pictures and hence cannot be correctly decoded. However, HEVC specifies that the leading pictures of the starting CRA picture are not output, hence the name "clean random access." For establishment of bitstream conformance requirement, HEVC specifies a decoding process to generate unavailable reference pictures for decoding of the non-output leading pictures. However, conforming decoder implementations do not have to follow that decoding process, as long as it can generate identical output compared to when the decoding process is performed from the beginning of the bitstream.

It is worth noting that, in HEVC, a conforming bitstream may contain no IDR pictures at all, and consequently, may contain a subset of a coded video sequence or an incomplete coded video sequence.

Figure 7:
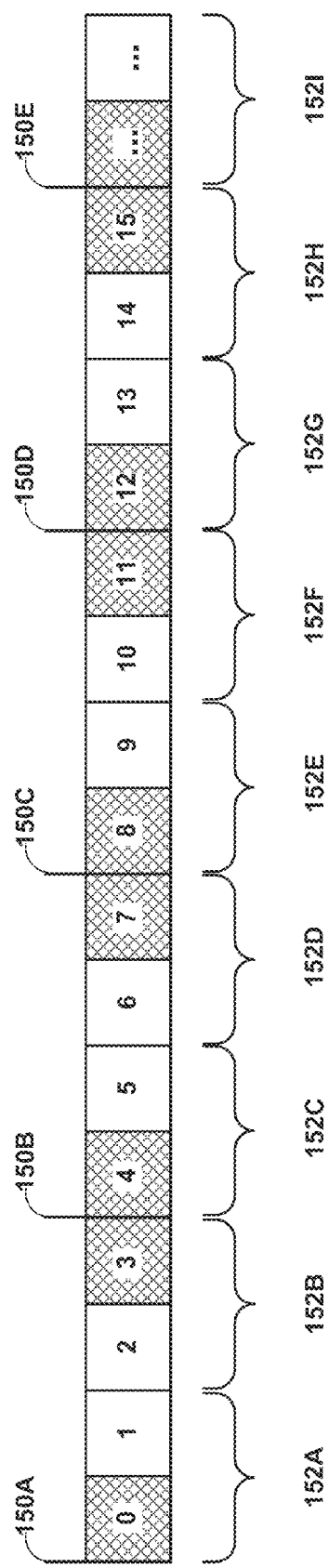
FIG. 7 is a conceptual diagram illustrating motion data compression in a line of blocks.

FIG. 7 is a conceptual diagram illustrating motion data compression in a line of blocks. In particular, the blocks are divided by 16×16 block boundaries 150A-150E. In the example of FIG. 7, motion information for shaded blocks may be stored in a line buffer. Unshaded blocks may share the motion information of a neighboring block. Thus, each of pairs of blocks 152A-152I may share motion information. The motion vector storage compression method in HEVC is designed to reduce the memory bandwidth spent on storing and loading temporal motion vectors for merge/skip mode and AMVP. The 16× compression method basically downsamples the motion vector field by a factor of four in both horizontal and vertical direction, resulting in a same motion vector for each 16×16 region.

Motion data generally includes inter prediction direction (e.g., to pictures having an earlier display time (List0), pictures having a later display time (List1), or bi-directional), reference picture index (e.g., an index into a reference picture list), and motion vector (MV), which may include a horizontal and a vertical component. For each PU that needs to access the motion data of the upper LCU row, only the compressed motion data in the line buffer can be accessed. FIG. 7 shows a 2:1 motion data compression of one line. For every four 4×4 blocks, the motion data of the first and the last 4×4 blocks are stored in the line buffer. The motion data of the first block represents the motion data of the first two blocks. The motion data of the last block represents the motion data of the last two blocks. In this way, only half as much memory is required.

In HEVC, an LCU may be divided into parallel motion estimation regions (MERs) and allow only those neighboring PUs which belong to different MERs from the current PU to be included in the merge/skip MVP list construction process. The size of the MER may be signaled in picture parameter set (PPS) as log 2_parallel_merge_level_minus2. When MER size is larger than N×N, wherein 2N×2N is the smallest CU size, MER may take effect in a way that a spatial neighboring block, if it is inside the same MER as the current PU, is considered as unavailable.

The HEVC-based 3D Video Coding (3D-HEVC) codec in MPEG is based on the solutions proposed in m22570 (Heiko Schwarz, Christian Bartnik, Sebastian Bosse, Heribert Brust, Tobias Hinz, Haricharan Lakshman, Detlev Marpe, Philipp Merkle, Karsten Müller, Hunn Rhee, Gerhard Tech, Martin Winken, Thomas Wiegand, "Description of 3D Video Technology Proposal by Fraunhofer HHI (HEVC compatible; configuration A)", ISO/IEC JTC1/SC29/WG11MPEG2011/m22570, Geneva, Switzerland, November 2011) and m22571. A description of the reference software for 3D-HEVC is available as Heiko Schwarz, Krzysztof Wegner, "Test Model under Consideration for HEVC based 3D video coding," ISO/IEC JTC1/SC29/WG11 MPEG2011/N12559, San Jose, USA, February 2012. The reference software, referred to as HTM, is available at https://hevc.hhi.fraunhofer.de/svn/svn_3DVCSoftware/trunk.

In "Disparity Vector Construction Method for 3D-HEVC," by Chen et al., U.S. Provisional Application Ser. Nos. 61/610,961 filed Mar. 14, 2012 and 61/623,041, filed Apr. 11, 2012, a disparity vector generation (construction) method from Spatial Disparity Vectors (SDV), Temporal Disparity Vectors (TDV) or Implicit Disparity Vectors (IDV) is described for inter-view motion prediction. As defined therein, an SDV is a motion vector of the spatial neighboring PU of the current PU that is pointing to an inter-view reference. A TDV may be a disparity motion vector from a co-located PU or a co-located LCU in any reference picture or inter-view picture with the same access unit. Alternatively, if the motion vector of the co-located PU from the picture used for TMVP or the motion vector generated by TMVP is a disparity vector, it may also be treated as a TDV. If a spatial or temporal neighboring PU of the current PU used inter-view motion prediction, the disparity vector that was used for the neighboring PU may be an IDV. Disparity vectors from the above three kinds may be used to construct a disparity vector candidate list and one of them may be selected based on some criteria and directly used for IMP.

Inter-view motion prediction can be applied to both AMVP and MERGE modes. For each PU, a Disparity Vector for Inter-View Motion Prediction (DVIVMP) is a disparity vector constructed and may be used for inter-view motion prediction. For including the inter-view motion prediction, the AMVP mode has been extended in a way that an inter-view motion vector predictor may be added to the candidate list. Based on the depth estimate for a middle sample of the current block, a disparity vector and a reference block in a reference view may be determined as described above. If the reference index for the current block refers to an inter-view reference picture, the inter-view motion vector predictor is set equal to the corresponding disparity vector. If the current reference index refers to a temporal reference picture and the reference block uses a motion hypothesis that refers to the same access unit as the current reference index, the motion vector that is associated with this motion hypothesis may be used as inter-view motion vector predictor. In other cases, the inter-view motion vector predictor may be marked as invalid and not included in the list of motion vector predictor candidates.

Similar to the AMVP mode, the candidate list of motion parameters may be extended by a motion parameter set that may be obtained using inter-view motion prediction. For each potential motion hypothesis, the first two reference indices of the reference picture list may be investigated in a given order. A motion vector candidate for the reference index 0 may be derived in the same way as for the AMVP mode. If the derived motion vector is valid, the reference index 0 and the derived motion vector may be used for the considered hypothesis. Otherwise, the reference index 1 may be tested in the same way. If it also results in an invalid motion vector, the motion hypothesis may be marked as not available. In order to prefer temporal prediction, the order in which reference indices are tested may be reversed if the first index refers to an inter-view reference picture. If all potential motion hypotheses are marked as not available, the inter-view candidate cannot be selected.

Inter-view residual prediction (IRP) is enabled in 3D-HEVC. Based on corresponding depth map (it may be estimated depth map) of current picture, a disparity vector may be determined for the current block. The disparity vector may then be used to locate the residual block in the reference view (residual reference block). When a residual prediction is enabled for a block, the residual reference block may be added in addition to the motion compensated predictor and the signaled residual for this block.

In "Motion Parameter Prediction and Coding for Multiview Video" by Chen et al., U.S. Provisional Application Ser. No. 61/621,929, filed Apr. 9, 2012, a disparity vector generation method from spatial and temporal neighboring blocks is described for both IMP and IRP. One of the solutions is defined as follows.

The candidate spatial neighboring blocks may be the same as those checked during AMVP and the order of them are $A_0$, $A_1$, $B_0$, $B_1$ or $B_2$ as depicted in FIG. 5. If a motion vector of one of the ordered spatial neighboring blocks is a disparity motion vector, it may be used to generate the disparity vector. A temporal disparity vector (TDV) from motion vectors of temporal neighboring blocks can be derived based on a set of reference pictures (named candidate pictures), for each candidate picture, a set of different blocks may be checked.

Candidate pictures may be checked in the ascending order of reference index. When one reference index corresponds to two pictures in RefPicList0 and RefPicList1, the picture from RefPicListX precedes the other picture where X is equal to collocated_from_10_flag precedes the other picture. Three candidate regions may be determined for each candidate picture. When a region covers multiple PUs or 16×16 regions, the PUs or upper-left 4×4 blocks of each 16×16 region of such a candidate region may be scanned in raster scan order. Otherwise, the upper-left 4×4 block may be chosen for the disparity vector derivation. CPU may correspond to the co-located region of the current PU; CLCU may correspond to the largest coding unit (LCU) covering the co-located region of the current PU; and BR may correspond to the bottom-right 4×4 block. The disparity vector generation process may be performed in PU or CU level when the disparity vector is used for IMP or IRP, respectively.

One of the most efficient coding tools is the Inter-view Motion Prediction (IMP) where the motion parameters of a block in a dependent view are predicted or inferred based on already coded motion parameters in other views of the same access unit.

Figure 8:
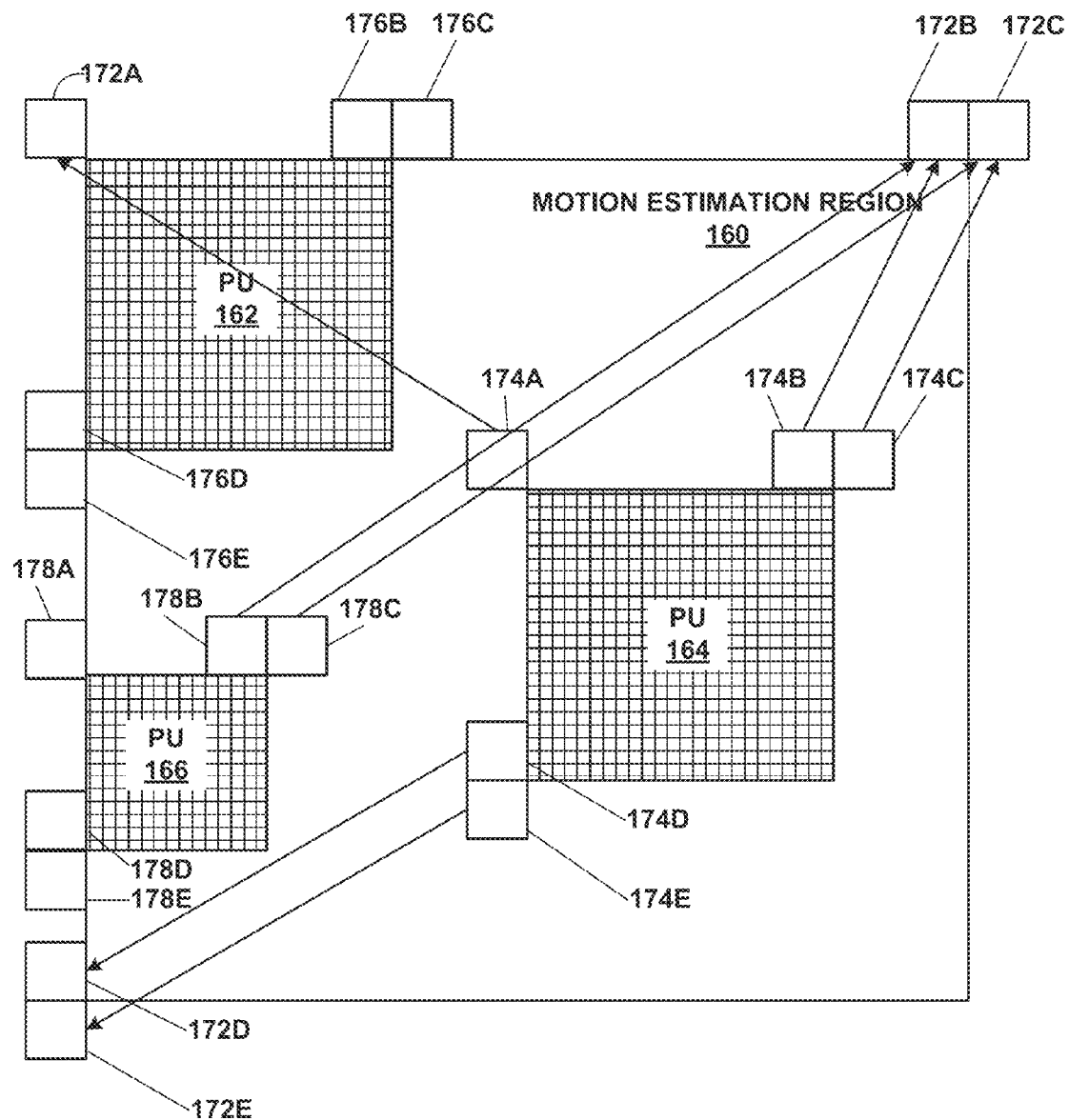
FIG. 8 is a conceptual diagram illustrating an example for substitutes outside a motion estimation range (MER) including a PU.

FIG. 8 is a conceptual diagram illustrating an example for substitutes outside a motion estimation range (MER) including a PU. In the example of FIG. 8, PUs 162, 164, and 166 are within MER 160. That is, MER 160 represents an example of a containing block that contains PUs 162, 164, and 166. In accordance with the techniques of this disclosure, a video coder, such as video encoder 20 and/or video decoder 30, may be configured to perform spatial disparity vector checking. In some examples, the video coder may use an MER when coding a PU. In this manner, the video coder might not be able to use blocks inside the MER to get spatial disparity vectors. In this case, substitution blocks may be used.

PUs 162, 164, 166 have neighboring blocks corresponding to blocks A0, A1, B0, B1, and B2 of FIG. 5. For instance, PU 162 neighbors neighboring blocks 172A, 176B, 176C, 176D, and 176E. PU 164, as another example, neighbors neighboring blocks 174A-174E. As still another example, PU 166 neighbors neighboring blocks 178A-178E. In addition, MER 160 has its own neighboring blocks, blocks 172A-172E. In general, neighboring blocks having the letter "A" at the end correspond to block B2 of FIG. 5, neighboring blocks having the letter "B" at the end correspond to block B1 of FIG. 5, neighboring blocks having the letter "C" at the end correspond to block B0 of FIG. 5, neighboring blocks having the letter "D" at the end correspond to block A1 of FIG. 5, and neighboring blocks having the letter "E" at the end correspond to block A0 of FIG. 5.

When the A0 or A1 neighboring (bottom-left) blocks of a PU, as depicted in FIG. 8, are inside MER 160 (such as blocks 174D and 174E), those blocks may be considered unavailable. Thus the A0 or A1 neighboring blocks of MER 160 (blocks 172D and 172E) may be used as a substitution. As shown for PU 164 in FIG. 8, the A0 and A1 blocks of PU 164 are blocks 174D and 174E, and are considered unavailable in this example, since they are inside MER 160 that also includes PU 164. Thus, video encoder 20 and video decoder 30 may substitute block 172D for block 174D, and block 172E for block 174E.

In this manner, blocks 174D and 174E represent examples of lower-left neighboring blocks to a current block (PU 164, in this example). Moreover, in this example, video encoder 20 and video decoder 30 may substitute blocks 172D and 172E for blocks 174D and 174E, respectively. This substitution represents an example of substituting a left neighboring block to MER 160 (e.g., blocks 172D, 172E) for the lower-left neighboring block to the current block (e.g., blocks 174D, 174E of PU 164).

When the B0 or B1 neighboring (top-right) blocks of a PU are inside MER 160, those blocks may be considered as unavailable. For instance, neighboring blocks 178B, 178C, which neighbor PU 166, and neighboring blocks 174B, 174C, which neighbor PU 164, may be considered unavailable. Thus, the B0 or B1 neighboring blocks of MER 160 (blocks 172B, 172C, in this example) may be used as substitutes. As shown for PU 166 in FIG. 8, blocks 178B and 178C are unavailable in this example, since they are inside MER 160, which also includes PU 166. Thus, video encoder 29 and video decoder 30 may substitute neighboring blocks 172B, 172C (neighboring blocks of MER 160) for neighboring blocks 178B, 178C. Likewise, video encoder 20 and video decoder 30 may substitute neighboring blocks 172B, 172C (neighboring blocks of MER 160) for neighboring blocks 174B, 174C to PU 164.

This substitution represents an example in which, when a neighboring block in a containing block that also contains the current block (e.g., one of PUs 164, 166) corresponds to an upper-right neighboring block (e.g., one of blocks 174B, 174C, 178B, 178C) to the current block, video encoder 20 and video decoder 30 may substitute an upper-right neighboring block (e.g., one of blocks 172B, 172C) to MER 160 for the upper-right neighboring block (e.g., one of blocks 174B, 174C, 178B, 178C) to the current block (e.g., one of PUs 164, 166). Arrows drawn in FIG. 8 between neighboring blocks represent substitutions.

When the B2 neighboring (top-left) blocks of a PU is inside MER 160 that also includes the PU (e.g., neighboring block 174A to PU 164), the neighboring block may be considered as unavailable. Thus, video encoder 20 and video decoder 30 may substitute the B2 neighboring block of MER 160 (e.g., neighboring block 172A) as a substitute for neighboring block 174A of PU 164. This substitution represents an example in which, when the neighboring block corresponds to an upper-left neighboring block to the current block, video encoder 20 and/or video decoder 30 may substitute an upper-left neighboring block to the MER for the upper-left neighboring block to the current block.

When all the neighboring blocks of a PU are outside an MER including the PU, no substitution is needed. This is the case for neighboring blocks 172A, 176B-176E to PU 162 in the example of FIG. 8.

Figure 9:
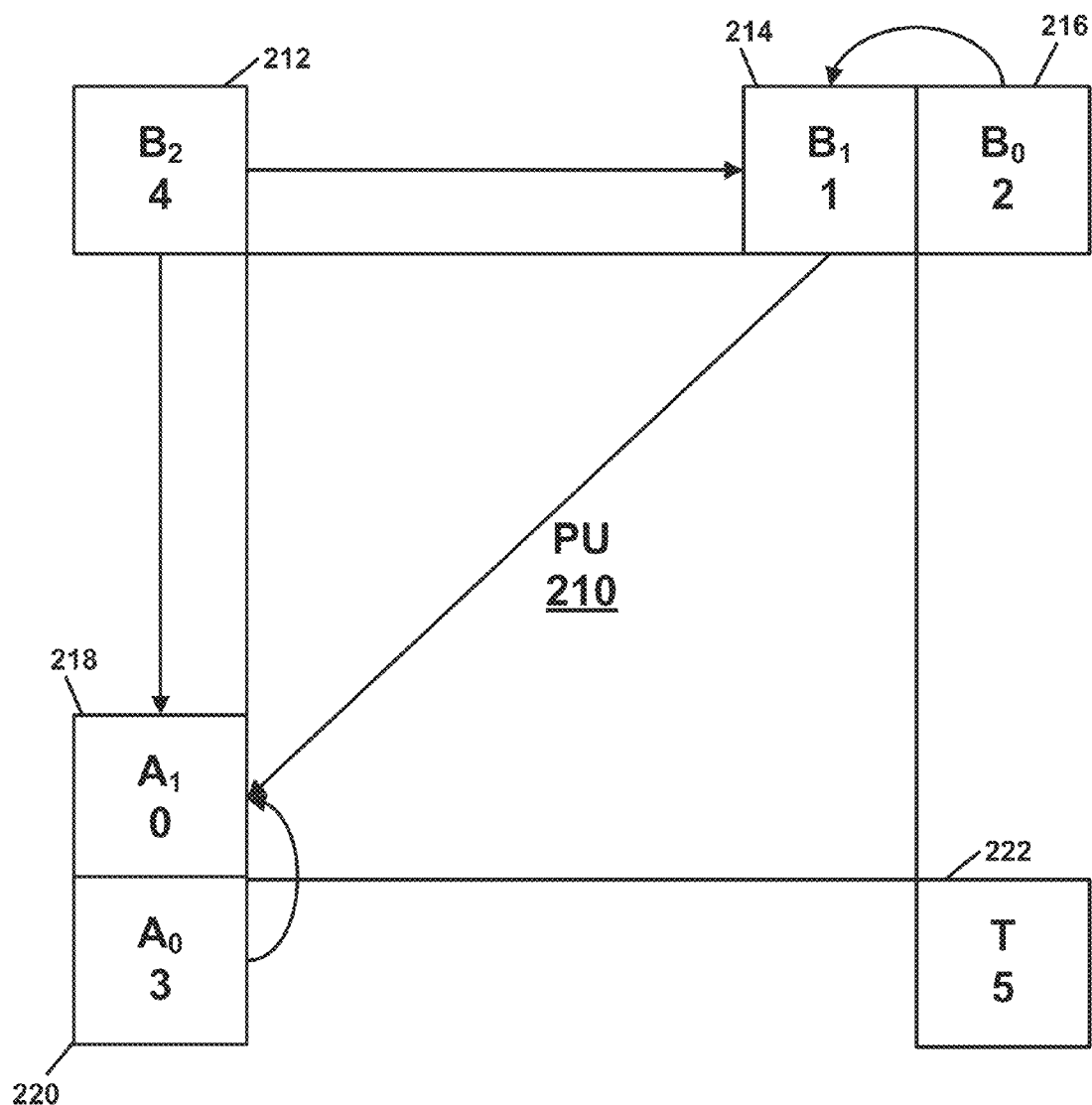
FIG. 9 is a conceptual diagram illustrating an example of a PU for which disparity vectors are checked.

FIG. 9 is a conceptual diagram illustrating an example of a PU 210 for which disparity vectors are checked. FIG. 9 illustrates relative neighboring positions using arrows and numbers below each position definition. PU 210 has neighboring spatial blocks 212-220 and neighboring temporal block 222. Note that a video coder performing disparity vector generation may check other types of disparity vectors in addition to the spatial neighbor disparity vectors of FIG. 9, e.g., temporal disparity vectors, as described in "Motion Parameter Prediction and Coding for Multiview Video" by Chen et al., discussed above. The example of FIG. 9 describes the case when spatial disparity vectors are checked from neighboring blocks 212-220, which happen to be the same as those checked in AMVP or MERGE. In such a case, when MER is used, substitutions may be introduced, as discussed above with respect to FIG. 8. Other processes may be kept unchanged.

Alternatively, when the spatial neighboring blocks are inside an MER, the horizontally or vertically aligned blocks that are at the boundary of MER may be checked instead of checking those inside the MER. For blocks 220, 218 (corresponding to blocks A0, A1, respectively), the horizontally aligned bock at the left boundary of the MER may be used as a substitution. For blocks 216, 214 (corresponding to blocks B0, B1, respectively), the vertically aligned block at the top boundary of the MER may be used as a substitution. For block 212 (corresponding to block B2), both the horizontally aligned block at the left boundary of the MER and the vertically aligned block at the top boundary of the MER can be used as substitutions.

Figure 10:
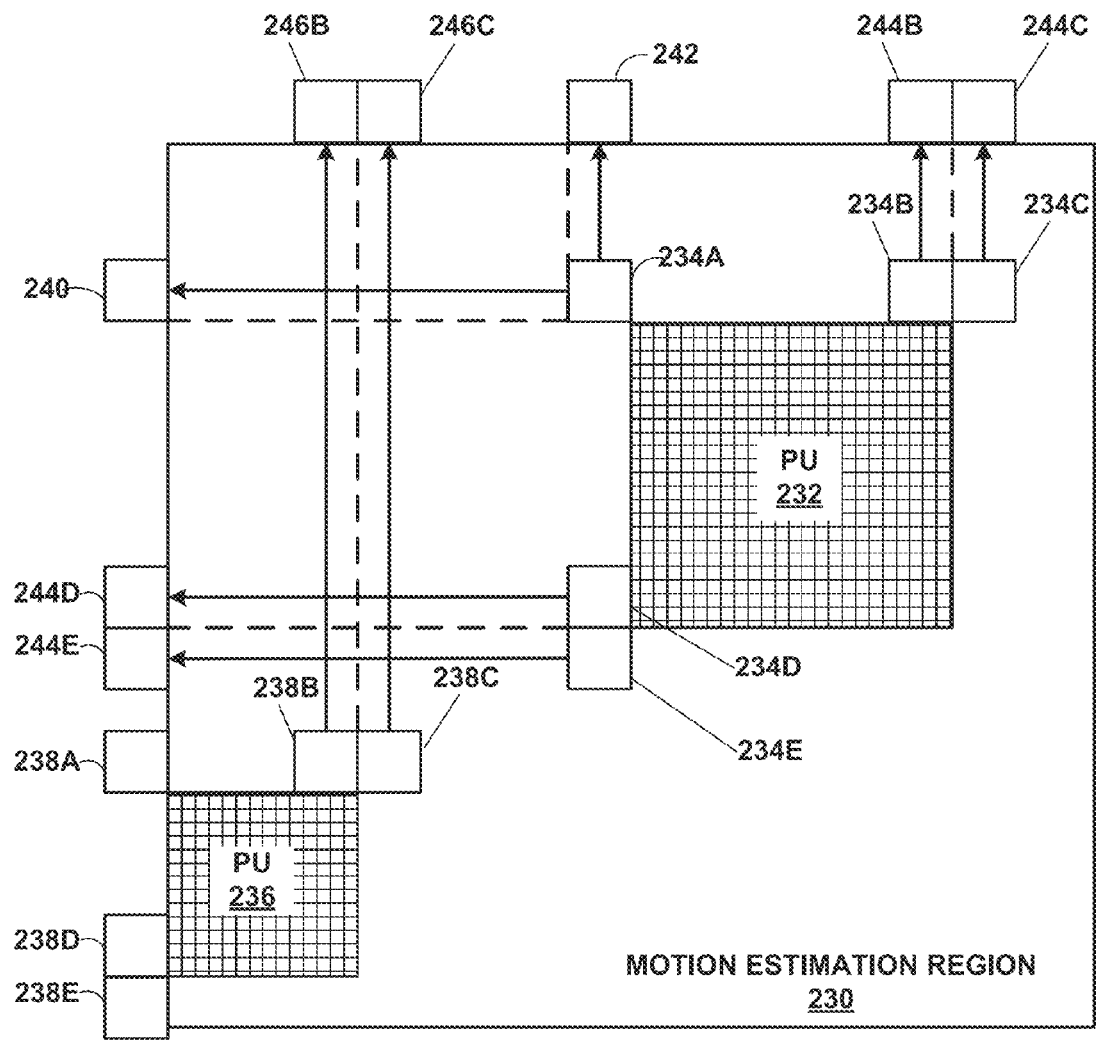
FIG. 10 is a conceptual diagram illustrating an alternative example for substitutes outside an MER including a PU.

FIG. 10 is a conceptual diagram illustrating an alternative example for substitutes outside an MER including a PU. The example of FIG. 10 illustrates MER 230, which includes PUs 232, 236. PU 232 has spatial neighboring blocks 234A-234E. PU 236 has spatial neighboring blocks 238A-238E. As depicted in FIG. 10, when the A0 or A1 neighboring blocks of a PU are inside an MER including the PU, they may be considered as unavailable. Thus, the aligned block (that is, vertically aligned blocks) outside of the MER in the horizontal direction may be used as a substitution. As shown for PU 232 in FIG. 10, blocks 234D and 234E (corresponding to blocks A0 and A1) of PU 232, are unavailable, since they are inside MER 230 which also includes PU 232. Thus, video encoder 20 and video decoder 30 may substitute blocks 244D, 244E for blocks 234D, 234E, respectively. Blocks 244D, 244E have the same vertical position as blocks 234D, 234E, but are outside MER 230 and neighbor MER 230, in this example.

In this manner, substituting blocks 244D and 244E for blocks 234D and 234E represents an example in which, when the neighboring block to a current block (e.g., PU 232) corresponds to a lower-left neighboring block (blocks 234D, 234E) to the current block, video encoder 20 and video decoder 30 may substitute a left neighboring block to MER 230 (e.g., a respective one of blocks 244D, 244E) for the lower-left neighboring block (e.g., one of blocks 234D, 234E) to the current block such that the left neighboring block to the MER has the same vertical position as the lower-left neighboring block to the current block. In particular, block 244D has the same vertical position as block 234D, and block 244E has the same vertical position as block 234E, in this example.

When the B0 or B1 neighboring (top-right) blocks of a PU are inside a MER including the PU, they may be considered as unavailable. Thus, the aligned block (that is, horizontally aligned blocks) outside of the MER in the vertical direction may be used as a substitution. As shown for PU 236 in FIG. 10, for example, neighboring blocks 238B, 238C to PU 236 are unavailable, since they are inside MER 230, which includes PU 236. Thus, video encoder 20 and video decoder 30 may substitute blocks 246B, 246C for blocks 238B, 238C, where blocks 246B, 246C have the same horizontal position as blocks 238B, 238C, respectively, but have a vertical position that places blocks 246B, 246C outside of MER 230. This is also the case for PU 232, in particular, neighboring blocks 234B, 234C to PU 232, for which video encoder 20 and video decoder 30 may substitute blocks 244B, 244C, respectively.

Therefore, substituting blocks 246B, 246C, 244B, 244C, for blocks 238B, 238C, 234B, 234C, respectively, represents an example in which, when the neighboring block to a current block corresponds to an upper-right neighboring block to the current block, video encoder 20 and video decoder 30 may substitute an upper neighboring block to the MER for the upper-right neighboring block to the current block such that the upper neighboring block to the MER has the same horizontal position as the upper-right neighboring block to the current block.

When the B2 neighboring (top-left) block of a PU is inside a MER, the block may be considered as unavailable. Video encoder 20 and video decoder 30 may substitute either of the aligned blocks in the horizontal or vertical direct but outside of MER 230. This is the case for neighboring block 234A to PU 232 in FIG. 10, for which blocks 240, 242 may be used as substitutions. Substituting block 240 for block 234A represents an example in which, when the neighboring block to the current block corresponds to an upper-left neighboring block to the current block, video encoder 20 and video decoder 30 may substitute a left neighboring block to the MER for the upper-left neighboring block to the current block such that the left neighboring block to the MER has the same vertical position as the upper-left neighboring block to the current block. Substituting block 242 for block 234A represents an example in which, when the neighboring block to the current block corresponds to an upper-left neighboring block to the current block, substituting an upper neighboring block to the MER for the upper-left neighboring block to the current block such that the upper neighboring block to the MER has the same horizontal position as the upper-left neighboring block to the current block.

In this manner, as an alternative to the example of FIG. 8, a disparity motion generation method, performed by video encoder 20 and video decoder 30, may check various neighboring blocks. In this case, when a neighboring block of a PU is inside the MER, video encoder 20 and video decoder 30 may substitute a neighboring block in a similar location or direction of the MER containing the PU for a neighboring block to the PU that is inside the MER.

Figure 11:
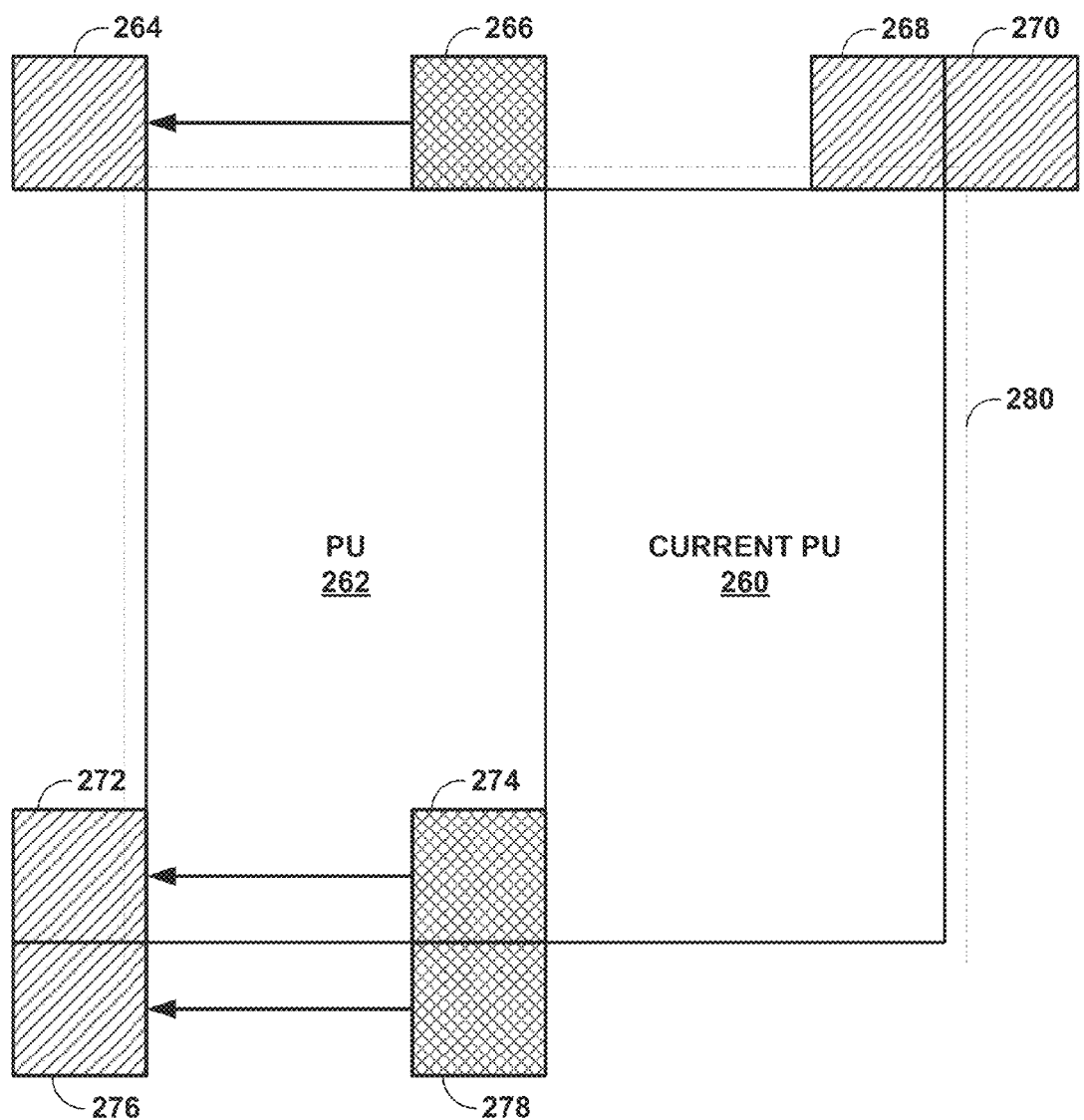
FIG. 11 is a conceptual diagram illustrating an example in which one or more candidate blocks for disparity vectors for a PU are within a CU including the PU.

FIG. 11 is a conceptual diagram illustrating an example in which one or more candidate blocks for disparity vectors for a PU are within a CU including the PU. This example is related to the unification of PU level disparity vector generation to CU level disparity generation. In this example, for a given PU (e.g., current PU 260), instead of checking spatial neighboring blocks 266, 274, 278, only the spatial neighboring blocks of CU 280 containing current PU 260 may be checked.

With respect to the example shown in FIG. 11, neighboring blocks 266, 274, 278 to current PU 260, which were to be checked, are now not checked, since there might not be the neighboring block of CU 280, or might not belong to any of B0, B1, B2, A0, A1 locations of the CU (locations B0, B1, B2, A0, A1 are defined with respect to the discussion of FIG. 9). Disparity vector generation may check other types of disparity vectors, e.g., temporal disparity vectors, as described in "Motion Parameter Prediction and Coding for Multiview Video" by Chen et al., discussed above. In this manner, this example may unify the spatial neighboring blocks for PUs and CUs, so that such spatial neighboring blocks can share the same process for the spatial disparity vector checking and yield the same results.

Accordingly, CU 280 represents an example of a containing block that contains current PU 260. Video encoder 20 and video decoder 30 may substitute block 264 for block 266, block 272 for block 274, and block 276 for block 278, in order to code a motion vector of current PU 260. In this manner, PUs 260, 262 may be coded in parallel.

In some examples, a video coder may perform techniques similar to those explained with respect to FIG. 11 for the MER case, e.g., for a PU inside an MER, the processes and results of spatial disparity vector checking for the PU may be the same as that for the MER containing a PU.

In some examples, the MER and PU/CU disparity vector generation techniques may be unified. The maximum size of MER and CU may be chosen to be the size of the disparity generation block unit used for spatial disparity vector checking Similar to the examples above, each PU or CU inside a MER or CU may share the same processes and results for spatial disparity vector checking.

For example, assume that the current CU size is 16×16, while the size of MER is 32×32. In this case, the disparity generation block unit used to get the spatial disparity vectors has a size of 32×32 and covers the current PU, and each CU and PU inside this 32×32 block unit shares the same processes and results for spatial disparity vector checking.

As another example, assume that the current CU size is 16×16, while the size of MER is 4×4. In this case, the disparity generation block unit used to get the spatial disparity vectors has a size of 16×16 and covers the current PU, and each PU inside this 16×16 coding unit shares the same processes and results for spatial disparity vector checking.

Figure 12:
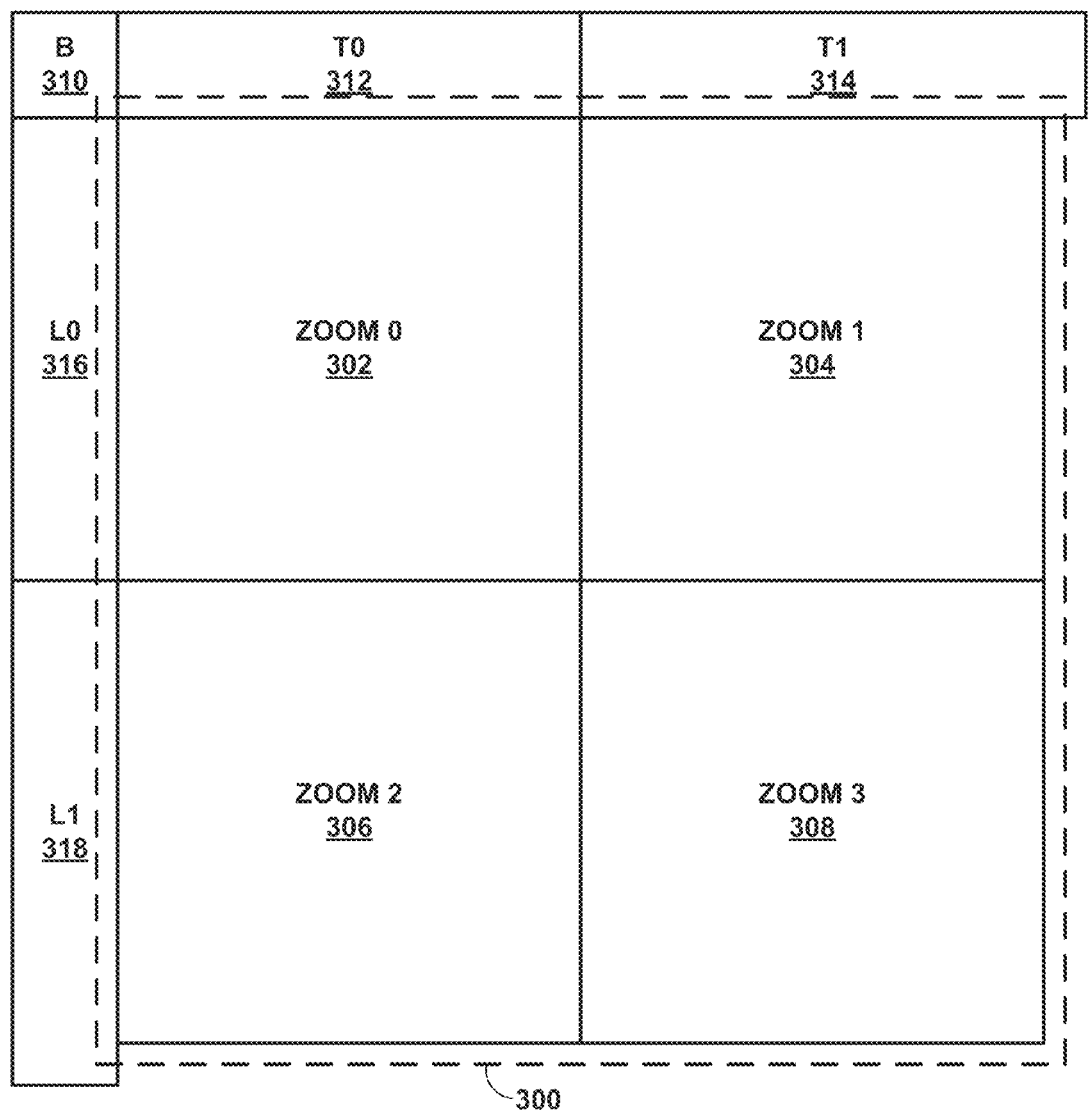
FIG. 12 is a conceptual diagram illustrating an example of disparity vector generation for a disparity generation block unit.

FIG. 12 is a conceptual diagram illustrating an example of disparity vector generation for a disparity generation block unit. In this example, a disparity generation block unit may be defined as the larger of the current CU and the MER containing any PU. Assume the disparity generation block unit has a size of 2M×2M pixels and the top-left pixel coordinate is (x0,y0). The top neighboring (4×4) blocks (in T0 312 and T1 314) and the left neighboring blocks (in L0 316 and L1 318) of a Disparity Generation Block Unit (DGBU) 300 may be used to predict a given PU.

The top neighboring blocks may be separated into two parts: T0 312 and T1 314, where T0 312 covers the blocks within the first half of the width of DGBU 300 (M) and T1 314 covers the blocks including the second half of the width of DGBU 300 (M) and one more block, which is the top-right neighboring block of DGBU 300.

The left neighboring blocks may be separated into two parts: L0 316 and L1 318, wherein L0 316 covers the blocks within the first half of the height of DGBU 300 (M) and T1 318 covers the blocks including the second half of the height of DGBU 300 (M) and one more block, which is the bottom-left neighboring of DGBU 300.

The top-left block, denoted as B 310, can either be as part of T0 312 or L0 314, depending on the location of the PU or CU, e.g., within one of regions zoom 0 302, zoom 1 304, zoom 2 306, zoom 3 308. Alternatively, B 310 may always belong to T0 312. Alternatively B may always belong to L0 316. T0 312, T1 314, L0 316, and L1 318 may thus be denoted for neighboring regions.

The order of the four regions to be checked may depend on the relative location of the chosen pixel of the central PU or CU relative to the top-left pixel (x0,y0) of DGBU 300, denoted as (dx, dy). The chosen pixel can be from the middle of the PU or CU. Firstly, DGBU 300 may be separated into four zooms (zoom 0 302, zoom 1 304, zoom 2 306, zoom 3 308), each represented by the relative coordination of the top-left pixel location and the bottom-right pixel location, as follows (depicted in FIG. 12): Zoom 0 302: (0, 0) and (M, M); Zoom 1 304: (M+1, 0) and (2M−1, M); Zoom 2 306: (0, M+1) and (M, 2M−1); and Zoom 3 308: (M+1, M+1) and (2M−1, 2M−1). Alternatively, the chosen pixel can be the top-left corner of the PU or CU and the 4 zooms may be redefined accordingly.

The order of T0 312, T1 314, L0 316, and L1 318 may be defined as follows: If (dx, dy) is in Zoom 0 312, and dx=dy, the order may be L0 316, T0 312 312, L1 318 318, T1 314 314. Alternatively, the order of L0 316 316 and T0 312 312 may be switchable and the order of L1 318 318 and T1 314 314 may be switchable. If (dx, dy) is in Zoom 0 302 and dx<dy, the order may be L0 316, T0 312, L1 318, T1 314, alternatively, the order can be L0 316, L1 318, T0 312, T1 314. If (dx, dy) is in Zoom 0 302 and dx>dy, the order may be T0 312, L0 316, T1 314, L1 318, alternatively, the order can be T0 312, T1 314, L0 316, L1 318. If (dx, dy) is in Zoom 1 304, the order may be T1 314, T0 312, L0 316, L1 318. If (dx, dy) is in Zoom 2 306, and dx=dy, the order may be L1 318, T1 314, L0 316, T0 312, alternatively, the order of L0 316 and T0 312 may be switchable and the order of L1 318 and T1 314 may be switchable. If (dx, dy) is in zoom 3 308, and dx<dy, the order may be L1 318, T1 314, L0 316, T0 312, alternatively, the order can be L1 318, T1 314, L0 316, T0 312. If (dx, dy) is in zoom 3, and dx>dy, the order may be T1 314, L1 318, T0 312, L0 316, alternatively, the order can be T1 314, T0 312, L1 318, L0 316.

For each region, a video coder may check all the blocks (4×4) from left to right or top to bottom depending on whether it belongs to a top region or left region. Once a disparity vector is available, the disparity vector is generated and the scan for the whole region is terminated and the generation process may return this disparity vector. If no disparity vector is available, the generation process may return empty.

The availability of a disparity vector may be defined as available if the following are true: at least one motion vector in the block is a disparity motion vector, and the disparity motion vector matches the target disparity vector, in terms of the reference view and the target view. Alternatively, the availability of a disparity vector may be defined as available if at least one motion vector in the block is a disparity motion vector.

A video coder may be configured to generate a spatial disparity vector for any PU. First, the disparity vector for each region may be generated and temporally stored, so there can be up to 4 disparity vectors, in this example. For each PU or CU, since the order of L0 316, L1 318, T0 312, T1 314 may be determined as discussed above, each region may be checked in a given order. When each of the region is checked and its corresponding disparity vector (which is already generated or known as empty) is not empty, it may be set to the disparity vector of the PU or CU, and the whole process may stop. If no disparity vector is found, the whole process may return an empty (not available disparity vector).

The video coder may also allocate the top-left block "B 310." One alternative mentioned above related to which region the block B belongs to can be dependent on the order of the regions. In one example, the video coder allocates B 310 to L0 316 or T0 312 depending on which region is first checked.

In an alternative example, the L0 316 and L1 318 may be combined to L and T0 312 and T1 314 may be combined to T. Meanwhile, B 310 may be removed from either T or L, if applied. (dx, dy) may still be the relative coordination of the chosen pixel. The order of the checked regions may be defined as B; if (dx<=dy): L, otherwise T; and if (dx<=dy): T, otherwise L. Alternatively, the order of the checked regions may be: if (dx<=dy): L, otherwise T; if (dx<=dy): T, otherwise L; and B.

In another alternative, the scanning order inside L or T are not just from left to right or top to bottom. (dx, dy) is still the relative coordination of the chosen pixel. If dx<=M, the scan order of the blocks in T may be from left to right, otherwise, from right to left. If dy<=M, the scan order of the blocks in L may be from top to bottom, otherwise, is from bottom to top.

In another alternative, the scanning order inside L0 316, L1 318, T0 312 or T1 314 are not just from left to right or top to bottom. The order inside a L0 316, L1 318, T0 312, or T1 314, might be reversed depending on the relative coordination of the chosen pixel (dx,dy). For example, if M/2<dx<=M, the scan order of the blocks inside T0 312 may be from right to left.

In another alternative, not all of the blocks in L0 316, L1 318, T0 312 or T1 314 are scanned, just the middle block of each region (L0 316, L1 318, T0 312 and T1 314) may be scanned. All coordinates may be relative to (x0,y0). For L0 316, the middle block starts from a relative y-coordination of M/2. For L1 318, the middle block starts from a relative y-coordination of M*3/2. For T0 312, the middle block starts from a relative x-coordination of M/2. For T1 314, the middle block starts from a relative x-coordination of M*3/2. In this case, B may be additionally added. Thus, altogether, only 4 or 5 blocks may be checked for spatial blocks during disparity vector generation.

Alternatively, only the middle block of each combined region (L and T) as described above may be scanned. For L, the middle block may start from a relative y-coordination of M; for T, the middle block may start from a relative x-coordination of M. In addition, B may be added. Thus, altogether, only 2 or 3 blocks may be checked.

Alternatively, only the middle block of each region (L and T) may be scanned. Here, L or T may include B.

In another alternative, the order of T0 312, T1 314, L0 316 and L1 318 may be fixed for all PUs or CUs in a disparity generation block unit. The checking order can be: L1 318, L0 316, T1 314, T0 312, B. Alternatively, any permutation of the above order can be applied. For blocks in L1 318 or L0 316, the checking order can be either from top to bottom or from bottom to top. For blocks in T1 314 or T0 312, the checking order can be either from left to right or from right to left.

Alternatively, the scanning order inside L or T may not just be from left to right or top to bottom. For example, L may be scanned from right to left and T maybe scanned from bottom to right. Alternatively, any other permutations of the scanning order may be applied.

Figure 13:
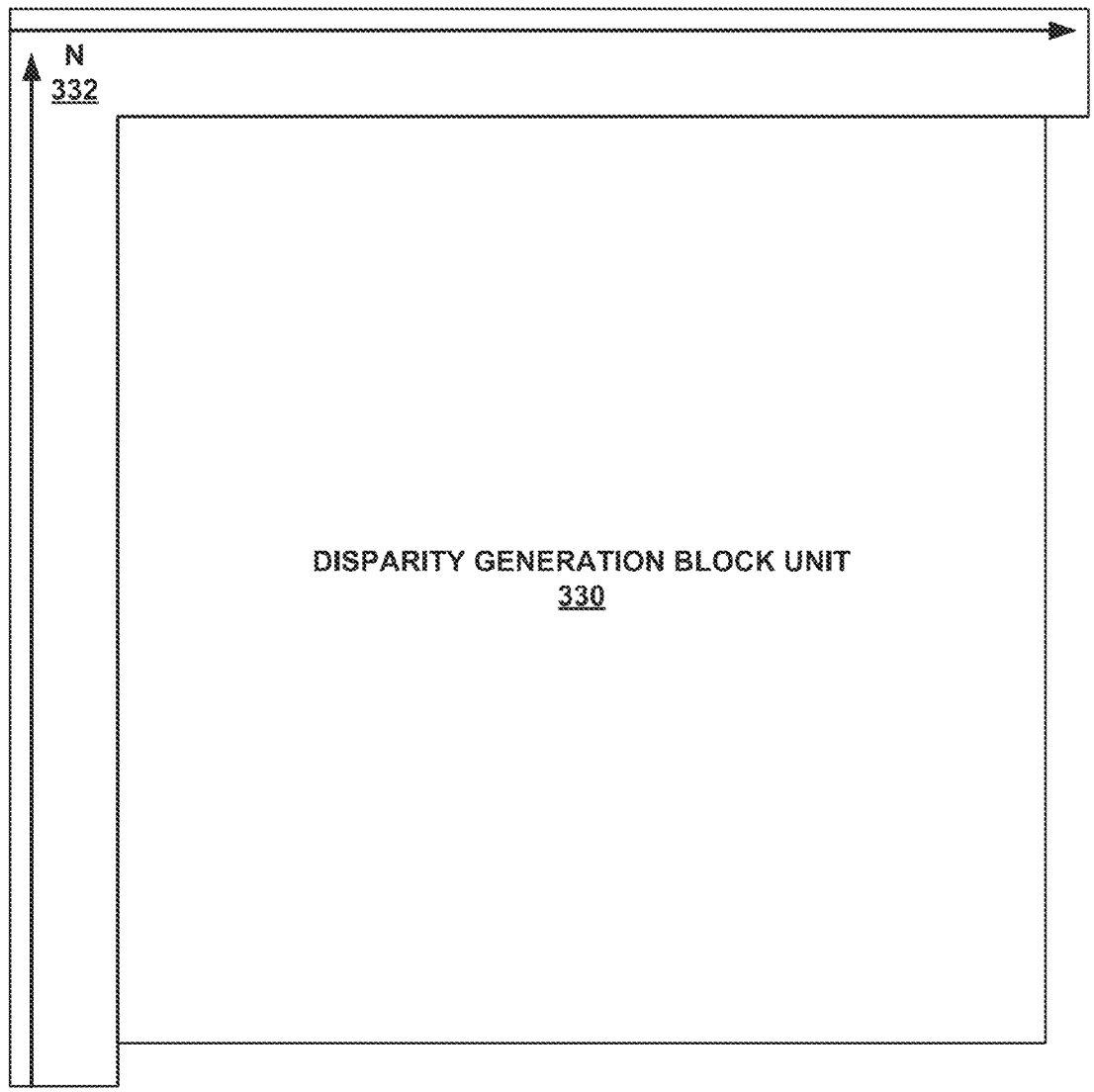
FIG. 13 is a conceptual diagram illustrating an example for a scan order of neighboring blocks when combined as one region.

FIG. 13 is a conceptual diagram illustrating an example for a scan order of neighboring blocks when combined as one region. The example of FIG. 13 is similar to the examples above of FIG. 12, except that the L, T, and B regions of FIG. 12 are further combined to form region N 332. A video coder may scan N 332 from bottom to top (to B 310 position of FIG. 12) and then from left to right, as shown in FIG. 13.

Alternatively, the L, T, and B regions may be further combined to region N, and N may be scanned from a reversed order (e.g., right-to-left, then top-to-bottom).

Alternatively, the order can be a reversed as from right to left (in the top blocks) and top to bottom (in the left blocks), and whether it is the original order or the reserved order can be decided by whether dx<=dy. For example, if (dx<=dy), the video coder may use the original order, otherwise the video coder may use the reversed order.

Figure 14:
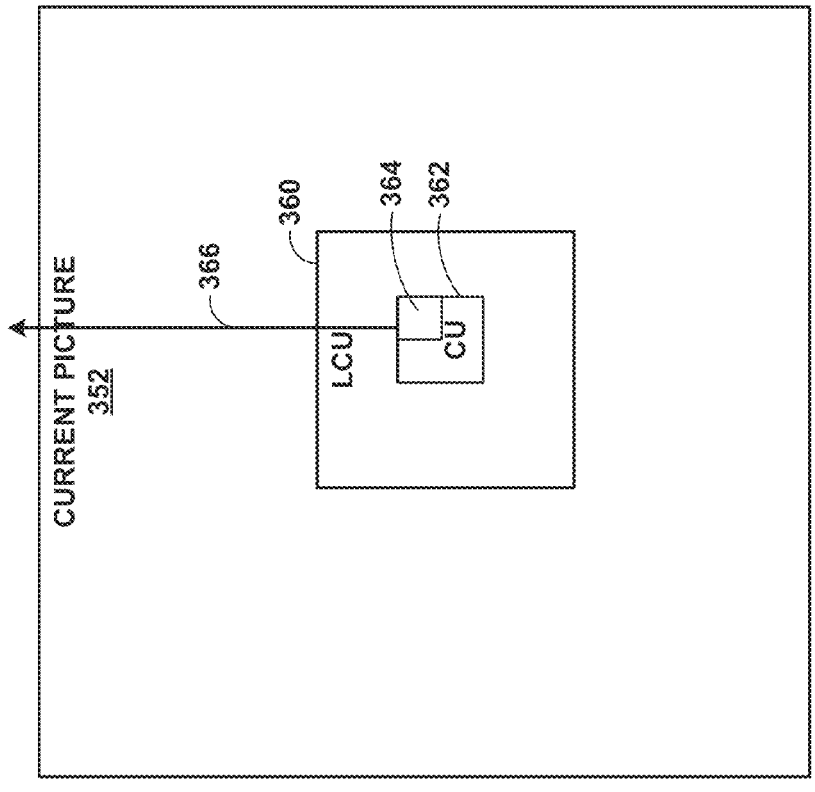
FIG. 14 is a conceptual diagram illustrating an example method for temporal disparity vector checking.
Figure 14:
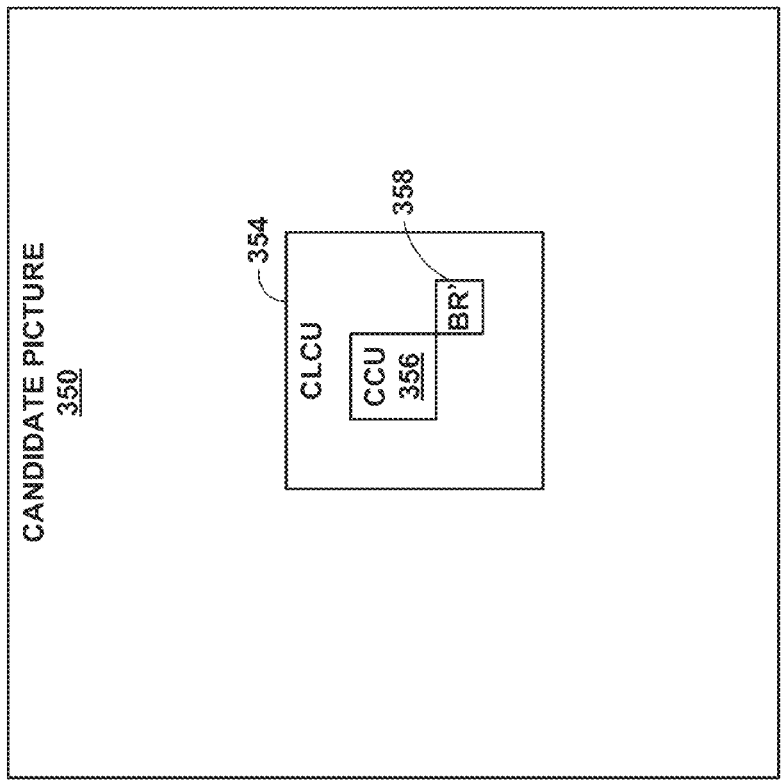

FIG. 14 is a conceptual diagram illustrating an example method for temporal disparity vector checking FIG. 14 illustrates an example in which PU level disparity vector generation is unified to CU level for spatial neighboring blocks. Thus, this example is related to the unification of PU level disparity vector generation to CU level disparity generation.

For a given PU 364 of a CU 362 in an LCU 360 of current picture 352, where PU 364 is predicted using a disparity motion vector 366, a Co-located CU (CCU) may always be checked, e.g., by a video coder, such as video encoder 20 or video decoder 30. For each PU in a CU or each CU of a current picture 352, a co-located region of the CU, denoted as CCU 356, may be identified. The largest CU containing CCU 356, denoted by CLCU 354, and the bottom-right 4×4 block of CCU 356 (denoted by BR' 358) may be used as temporal neighboring blocks, as shown in FIG. 14.

Note that the order of the above three regions can be similar to what is mentioned in "Motion Parameter Prediction and Coding for Multiview Video" by Chen et al. For example, the order may be CCU 356, CLCU 354, and BR' 358, or BR' 358, CCU 356, and CLCU 354.

When checking a CCU or CLCU that include multiple blocks, the 16×16 blocks of each CCU, or CLCU, may be checked in raster-scan order. Once a disparity vector is available, the checking process may terminate. Alternatively, BR' may be replaced by the one of the middle 4×4 block in CCU. Alternatively, BR' may be replaced by any other 4×4 block in CCU. Alternatively, BR' may be set unavailable and not checked. Alternatively, both BR' and CCU may be set unavailable and not checked.

Note that disparity vector generation may check other types of disparity vectors, e.g., spatial disparity vectors, as described in "Motion Parameter Prediction and Coding for Multiview Video" by Chen et al. The example of FIG. 14 may unify the temporal neighboring blocks for PUs and CUs, so that they can share the same process for the temporal disparity vector checking and the same results. The candidate picture selection method can be the same as described in "Motion Parameter Prediction and Coding for Multiview Video" by Chen et al.

As an alternative, if the CU size is smaller than 16×16, the CCU may be extended to a 16×16 block containing this CU. The remaining processes may be the same but applied to the extended CCU.

As an alternative, the process may be similar to that described in "Motion Parameter Prediction and Coding for Multiview Video" by Chen et al., but if the PU size is smaller than 16×16, the CPU may be extended to a 16×16 block containing this CU. The remaining processes may be the same but applied to the extended CCU.

Figure 15:
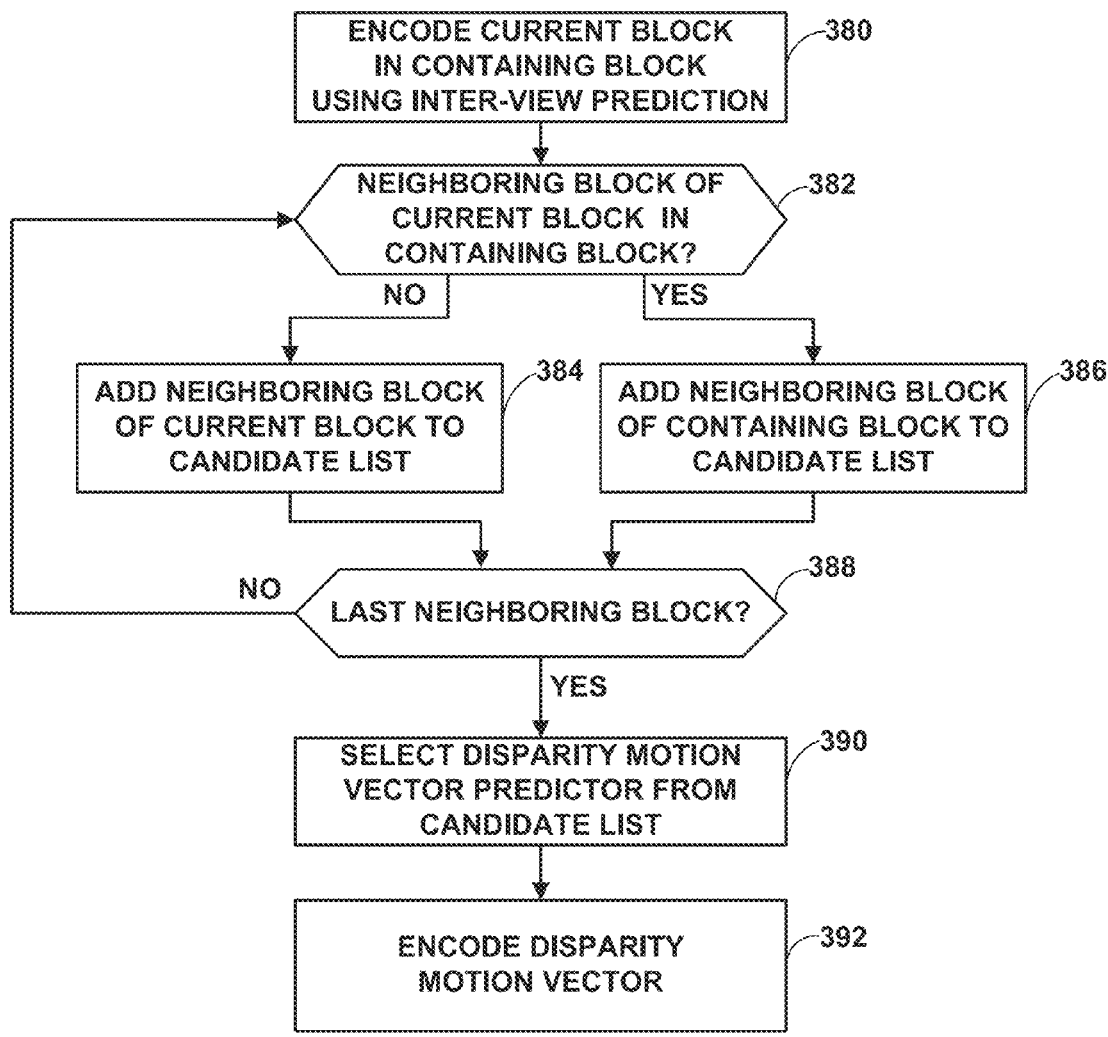
FIG. 15 is a flowchart illustrating an example method for encoding a disparity motion vector in accordance with the techniques of this disclosure.

FIG. 15 is a flowchart illustrating an example method for encoding a disparity motion vector in accordance with the techniques of this disclosure. Although explained with respect to video encoder 20, it should be understood that other devices or components may be configured to perform the method of FIG. 15. Moreover, although only one instance is shown, it should be understood that multiple instances of the method of FIG. 15 may be performed substantially simultaneously, e.g., in parallel, for multiple blocks of a common containing block (e.g., a MER or multiple PUs of a common CU).

In this example, video encoder 20 may first encode a current block in a containing block using inter-view prediction (380). For example, after performing various trial encoding passes, video encoder 20 may ultimately determine that the current block should be encoded using inter-view prediction. Thus, video encoder 20 may encode the current block using a disparity motion vector that points to an inter-view reference picture.

Video encoder 20 may then encode the disparity motion vector. To do so, video encoder 20 may form a candidate list including candidate motion vector predictors for the disparity motion vector. In particular, in accordance with the techniques of this disclosure, video encoder 20 may determine whether a particular neighboring block of the current block is in the containing block that includes the current block (382). If the neighboring block is not in the containing block ("NO" branch of 382), video encoder 20 may add the neighboring block of the current block to the candidate list (384). On the other hand, if the neighboring block is in the containing block that also includes the current block ("YES"

branch of 382), video encoder 20 may add a neighboring block of the containing block to the candidate list (386). In other words, video encoder 20 may substitute the neighboring block of the containing block for the neighboring block of the current block. Video encoder 20 may perform this substitution in accordance with the various examples described above, e.g., with respect to FIGS. 8-11, or other substitution schemes.

Video encoder 20 may then determine whether the previous neighboring block was the last neighboring block to be considered for addition to the candidate list (388). If the previous neighboring block was not the last neighboring block to be considered ("NO" branch of 388), video encoder 20 may consider the next neighboring block, and in particular, whether to substitute a neighboring block of the containing block for the next neighboring block of the current block, as discussed above. However, if the previous neighboring block was the last neighboring block ("YES" branch of 388), video encoder 20 may select a disparity motion vector predictor from the candidate list (390), potentially after pruning the candidate list, in some examples. Video encoder 20 may then encode the disparity motion vector using the disparity motion vector predictor (392), e.g., using merge mode or AMVP mode.

In this manner, the method of FIG. 15 represents an example of a method including encoding a current block of video data, within a containing block, using a disparity motion vector, based on a determination that a neighboring block to the current block is also within the containing block, substituting a block outside the containing block and that neighbors the containing block for the neighboring block in a candidate list, selecting a disparity motion vector predictor from one of a plurality of blocks in the candidate list, and encoding the disparity motion vector based on the disparity motion vector predictor.

Figure 16:
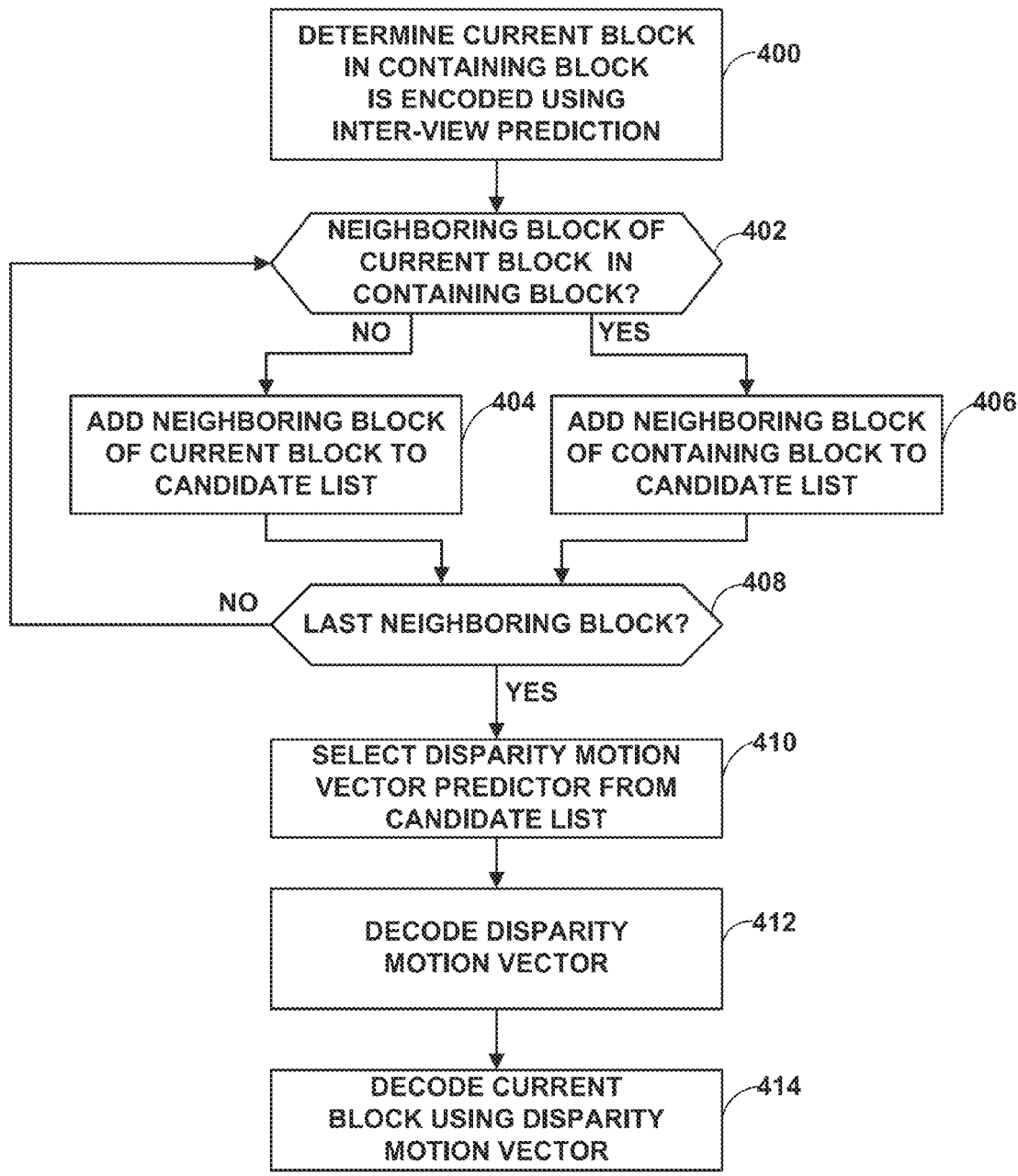
FIG. 16 is a flowchart illustrating an example method for decoding a disparity motion vector in accordance with the techniques of this disclosure.

FIG. 16 is a flowchart illustrating an example method for decoding a disparity motion vector in accordance with the techniques of this disclosure. Although explained with respect to video decoder 30, it should be understood that other devices or components may be configured to perform the method of FIG. 16. Moreover, although only one instance is shown, it should be understood that multiple instances of the method of FIG. 16 may be performed substantially simultaneously, e.g., in parallel, for multiple blocks of a common containing block (e.g., a MER or multiple PUs of a common CU).

Initially, video decoder 30 may determine that a current block in a containing block is encoded using inter-view prediction (400). Thus, video decoder 30 may determine that a disparity motion vector is to be decoded. Accordingly, video decoder 30 may construct a candidate list in substantially the same manner as was described with respect to FIG. 15 above. For instance, video decoder 30 may form a candidate list including candidate motion vector predictors for the disparity motion vector. In particular, in accordance with the techniques of this disclosure, video decoder 30 may determine whether a particular neighboring block of the current block is in the containing block that includes the current block (402). If the neighboring block is not in the containing block ("NO" branch of 402), video decoder 30 may add the neighboring block of the current block to the candidate list (404). On the other hand, if the neighboring block is in the containing block that also includes the current block ("YES" branch of 402), video decoder 30 may add a neighboring block of the containing block to the candidate list (406). In other words, video decoder 30 may substitute the neighboring block of the containing block for the neighboring block of the current block. Video decoder 30 may perform this substitution in accordance with the various examples described above, e.g., with respect to FIGS. 8-11, or other substitution schemes.

Video decoder 30 may then determine whether the previous neighboring block was the last neighboring block to be considered for addition to the candidate list (408). If the previous neighboring block was not the last neighboring block to be considered ("NO" branch of 388), video decoder 30 may consider the next neighboring block, and in particular, whether to substitute a neighboring block of the containing block for the next neighboring block of the current block, as discussed above. However, if the previous neighboring block was the last neighboring block ("YES" branch of 408), video decoder 30 may select a disparity motion vector predictor from the candidate list (410), potentially after pruning the candidate list, in some examples. For instance, video decoder 30 may decode a merge index or AMVP index, representing an index into the candidate list, and select the disparity motion vector predictor from the motion information of the neighboring block corresponding to the index into the candidate list.

Video decoder 30 may then decode the disparity motion vector using the disparity motion vector predictor (412), e.g., using merge mode or AMVP mode. For instance, in merge mode, video decoder 30 may determine that the disparity motion vector for the current block is equivalent to the disparity motion vector predictor as selected in step 410. Alternatively, in AMVP mode, video decoder 30 may further decode data defining a motion vector difference value, and video decoder 30 may reproduce the disparity motion vector by adding the motion vector difference value to the disparity motion vector predictor.

In any case, video decoder 30 may then decode the current block using the decoded disparity motion vector predictor (414). That is, video decoder 30 may generate a predicted block from the inter-view reference block identified by the disparity motion vector, decode syntax elements defining quantized transform coefficients, inverse quantize and inverse transform these coefficients to reproduce a residual block, and combine the predicted block with the residual block (by adding pixel values of the predicted block to pixel values of the residual block) to ultimately yield the current block.

In this manner, the method of FIG. 16 represents an example of a method including determining that a current block of video data is encoded using a disparity motion vector, wherein the current block is within a containing block, based on a determination that a neighboring block to the current block is also within the containing block, substituting a block outside the containing block and that neighbors the containing block for the neighboring block in a candidate list, selecting a disparity motion vector predictor from one of a plurality of blocks in the candidate list, and decoding the disparity motion vector based on the disparity motion vector predictor.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining that a current prediction unit (PU) of a current view of video data is encoded using a motion vector, wherein the current PU is within a coding unit (CU);
   based on a determination that a neighboring PU to the current PU is also within the CU, retrieving a first set of motion information for a PU outside the CU and that neighbors the CU;
   based on a determination that the first set of the motion information for the PU outside the CU defines a disparity motion vector, adding a second set of motion information from a PU of a reference view to a candidate list for the current PU, wherein the PU of the reference view is determined using the disparity motion vector;
   selecting a motion vector predictor from the second set of motion information; and
   decoding the motion vector based on the motion vector predictor.

2. The method of claim 1, wherein the current PU is within a motion estimation region (MER), and wherein the PU outside the CU is outside the MER.

3. The method of claim 2, wherein retrieving comprises, when the neighboring PU corresponds to a lower-left neighboring PU to the current PU, substituting a lower-left neighboring PU to the MER for the lower-left neighboring PU to the current PU.

4. The method of claim 2, wherein retrieving comprises, when the neighboring PU corresponds to a lower-left neighboring PU to the current PU, substituting a left neighboring PU to the MER for the lower-left neighboring PU to the current PU such that the left neighboring PU to the MER has the same vertical position as the lower-left neighboring PU to the current PU.

5. The method of claim 2, wherein retrieving comprises, when the neighboring PU corresponds to an upper-right neighboring PU to the current PU, substituting an upper-right neighboring PU to the MER for the upper-right neighboring PU to the current PU.

6. The method of claim 2, wherein retrieving comprises, when the neighboring PU corresponds to an upper-right neighboring PU to the current PU, substituting an upper neighboring PU to the MER for the upper-right neighboring PU to the current PU such that the upper neighboring PU to the MER has the same horizontal position as the upper-right neighboring PU to the current PU.

7. The method of claim 2, wherein retrieving comprises, when the neighboring PU corresponds to an upper-left neighboring PU to the current PU, substituting an upper-left neighboring PU to the MER for the upper-left neighboring PU to the current PU.

8. The method of claim 2, wherein retrieving comprises, when the neighboring PU corresponds to an upper-left neighboring PU to the current PU, substituting a left neighboring PU to the MER for the upper-left neighboring PU to the current PU such that the left neighboring PU to the MER has the same vertical position as the upper-left neighboring PU to the current PU.

9. The method of claim 2, wherein retrieving comprises, when the neighboring PU corresponds to an upper-left neighboring PU to the current PU, substituting an upper neighboring PU to the MER for the upper-left neighboring PU to the current PU such that the upper neighboring PU to the MER has the same horizontal position as the upper-left neighboring PU to the current PU.

10. The method of claim 1, further comprising decoding the current PU of video data using the motion vector.

11. The method of claim 1, wherein decoding the motion vector comprises:
    decoding a motion vector difference value; and
    adding the motion vector difference value to the motion vector predictor to reproduce the motion vector.

12. A device for decoding video data, the device comprising:
    a memory configured to store video data; and
    a video decoder configured to:
        determine that a current prediction unit (PU) of a current view of the video data is encoded using a motion vector, wherein the current PU is within a coding unit (CU),
        based on a determination that a neighboring PU to the current PU is also within the CU, retrieve a first set of motion information for a PU outside the CU and that neighbors the CU,
        based on a determination that the first set of the motion information for the PU outside the CU defines a disparity motion vector, add a second set of motion information from a PU of a reference view to a candidate list for the current PU, wherein the PU of the reference view is determined using the disparity motion vector,
        select a motion vector predictor from the second set of motion information, and
        decode the motion vector based on the motion vector predictor.

13. The device of claim 12, wherein the current PU is within a motion estimation region (MER), and wherein the PU outside the CU is outside the MER.

14. The device of claim 13, wherein the video decoder is configured to substitute, when the neighboring PU corresponds to a lower-left neighboring PU to the current PU, a lower-left neighboring PU to the MER for the lower-left neighboring PU to the current PU.

15. The device of claim 13, wherein the video decoder is configured to substitute, when the neighboring PU corresponds to a lower-left neighboring PU to the current PU, a left neighboring PU to the MER for the lower-left neighboring PU to the current PU such that the left neighboring PU to the MER has the same vertical position as the lower-left neighboring PU to the current PU.

16. The device of claim 13, wherein the video decoder is configured to substitute, when the neighboring PU corresponds to an upper-right neighboring PU to the current PU, an upper-right neighboring PU to the MER for the upper-right neighboring PU to the current PU.

17. The device of claim 13, wherein the video decoder is configured to substitute, when the neighboring PU corresponds to an upper-right neighboring PU to the current PU, an upper neighboring PU to the MER for the upper-right neighboring PU to the current PU such that the upper neighboring PU to the MER has the same horizontal position as the upper-right neighboring PU to the current PU.

18. The device of claim 13, wherein the video decoder is configured to substitute, when the neighboring PU corresponds to an upper-left neighboring PU to the current PU, an upper-left neighboring PU to the MER for the upper-left neighboring PU to the current PU.

19. The device of claim 13, wherein the video decoder is configured to substitute, when the neighboring PU corresponds to an upper-left neighboring PU to the current PU, a left neighboring PU to the MER for the upper-left neighboring PU to the current PU such that the left neighboring PU to the MER has the same vertical position as the upper-left neighboring PU to the current PU.

20. The device of claim 13, wherein the video decoder is configured to substitute, when the neighboring PU corresponds to an upper-left neighboring PU to the current PU, an upper neighboring PU to the MER for the upper-left neighboring PU to the current PU such that the upper neighboring PU to the MER has the same horizontal position as the upper-left neighboring PU to the current PU.

21. The device of claim 12, wherein the video decoder is further configured to decode the current PU of video data using the motion vector.

22. The device of claim 12, wherein the video decoder is configured to decode a motion vector difference value, and add the motion vector difference value to the motion vector predictor to reproduce the motion vector.

23. The device of claim 12, wherein the device comprises at least one of:
    an integrated circuit;
    a microprocessor; and
    a wireless communication device.

24. A device for decoding video data, the device comprising:
    means for determining that a current prediction unit (PU) of a current view of video data is encoded using a motion vector, wherein the current PU is within a coding unit (CU);
    means for retrieving, based on a determination that a neighboring PU to the current PU is also within the CU, a first set of motion information for a PU outside the CU and that neighbors the CU;
    means for adding, based on a determination that the first set of the motion information for the PU outside the CU defines a disparity motion vector, a second set of motion information from a PU of a reference view to a candidate list for the current PU, wherein the PU of the reference view is determined using the disparity motion vector;
    means for selecting a motion vector predictor from the second set of motion information; and
    means for decoding the motion vector based on the motion vector predictor.

25. The device of claim 24, wherein the current PU is within a motion estimation region (MER), and wherein the PU outside the CU is outside the MER.

26. A computer-readable storage medium having stored thereon instructions that, when executed, cause one or more processors to:
    determine that a current prediction unit (PU) of a current view of video data is encoded using a motion vector, wherein the current PU is within a coding unit (CU);
    based on a determination that a neighboring PU to the current PU is also within the CU, retrieve a first set of motion information for a PU outside the CU and that neighbors the CU;
    based on a determination that the first set of the motion information for the PU outside the CU defines a disparity motion vector, add a second set of motion information from a PU of a reference view to a candidate list for the current PU, wherein the PU of the reference view is determined using the disparity motion vector;

select a motion vector predictor from the second set of motion information; and decode the motion vector based on the motion vector predictor.

27. The computer-readable storage medium of claim 26, wherein the current PU is within a motion estimation region (MER), and wherein the PU outside the CU is outside the MER.

28. A method of encoding video data, the method comprising:

encoding a current prediction unit (PU) of a current view of video data, within a coding unit (CU), using a motion vector;

based on a determination that a neighboring PU to the current PU is also within the CU, retrieving a first set of motion information for a PU outside the CU and that neighbors the CU;

based on a determination that the first set of the motion information for the PU outside the CU defines a disparity motion vector, adding a second set of motion information from a PU of a reference view to a candidate list for the current PU, wherein the PU of the reference view is determined using the disparity motion vector;

selecting a motion vector predictor from the second set of motion information; and encoding the motion vector based on the motion vector predictor.

29. The method of claim 28, wherein the current PU is within a motion estimation region (MER), and wherein the PU outside the CU is outside the MER.

30. The method of claim 29, wherein retrieving comprises, when the neighboring PU corresponds to a lower-left neighboring PU to the current PU, substituting a lower-left neighboring PU to the MER for the lower-left neighboring PU to the current PU.

31. The method of claim 29, wherein retrieving comprises, when the neighboring PU corresponds to a lower-left neighboring PU to the current PU, substituting a left neighboring PU to the MER for the lower-left neighboring PU to the current PU such that the left neighboring PU to the MER has the same vertical position as the lower-left neighboring PU to the current PU.

32. The method of claim 29, wherein retrieving comprises, when the neighboring PU corresponds to an upper-right neighboring PU to the current PU, substituting an upper-right neighboring PU to the MER for the upper-right neighboring PU to the current PU.

33. The method of claim 29, wherein retrieving comprises, when the neighboring PU corresponds to an upper-right neighboring PU to the current PU, substituting an upper neighboring PU to the MER for the upper-right neighboring PU to the current PU such that the upper neighboring PU to the MER has the same horizontal position as the upper-right neighboring PU to the current PU.

34. The method of claim 29, wherein retrieving comprises, when the neighboring PU corresponds to an upper-left neighboring PU to the current PU, substituting an upper-left neighboring PU to the MER for the upper-left neighboring PU to the current PU.

35. The method of claim 29, wherein retrieving comprises, when the neighboring PU corresponds to an upper-left neighboring PU to the current PU, substituting a left neighboring PU to the MER for the upper-left neighboring PU to the current PU such that the left neighboring PU to the MER has the same vertical position as the upper-left neighboring PU to the current PU.

36. The method of claim 29, wherein retrieving comprises, when the neighboring PU corresponds to an upper-left neighboring PU to the current PU, substituting an upper neighboring PU to the MER for the upper-left neighboring PU to the current PU such that the upper neighboring PU to the MER has the same horizontal position as the upper-left neighboring PU to the current PU.

37. The method of claim 28, wherein encoding the motion vector comprises:

calculating a difference between the motion vector and the motion vector predictor; and encoding the difference.

38. A device for encoding video data, the device comprising a video encoder configured to:

encode a current prediction unit (PU) of a current view of video data, within a coding unit (CU), using a motion vector, based on a determination that a neighboring PU to the current PU is also within the CU, retrieve a first set of motion information for a PU outside the CU and that neighbors the CU, based on a determination that the first set of the motion information for the PU outside the CU defines a disparity motion vector, add a second set of motion information from a PU of a reference view to a candidate list for the current PU, wherein the PU of the reference view is determined using the disparity motion vector, select a motion vector predictor from the second set of motion information, and encode the motion vector based on the motion vector predictor.

39. The device of claim 38, wherein the current PU is within a motion estimation region (MER), and wherein the PU outside the CU is outside the MER.

40. The device of claim 39, wherein the video encoder is configured to substitute, when the neighboring PU corresponds to a lower-left neighboring PU to the current PU, a lower-left neighboring PU to the MER for the lower-left neighboring PU to the current PU.

41. The device of claim 39, wherein the video encoder is configured to substitute, when the neighboring PU corresponds to a lower-left neighboring PU to the current PU, a left neighboring PU to the MER for the lower-left neighboring PU to the current PU such that the left neighboring PU to the MER has the same vertical position as the lower-left neighboring PU to the current PU.

42. The device of claim 39, wherein the video encoder is configured to substitute, when the neighboring PU corresponds to an upper-right neighboring PU to the current PU, an upper-right neighboring PU to the MER for the upper-right neighboring PU to the current PU.

43. The device of claim 39, wherein the video encoder is configured to substitute, when the neighboring PU corresponds to an upper-right neighboring PU to the current PU, an upper neighboring PU to the MER for the upper-right neighboring PU to the current PU such that the upper neighboring PU to the MER has the same horizontal position as the upper-right neighboring PU to the current PU.

44. The device of claim 39, wherein the video encoder is configured to substitute, when the neighboring PU corresponds to an upper-left neighboring PU to the current PU, an upper-left neighboring PU to the MER for the upper-left neighboring PU to the current PU.

45. The device of claim 39, wherein the video encoder is configured to substitute, when the neighboring PU corresponds to an upper-left neighboring PU to the current PU, a left neighboring PU to the MER for the upper-left neighboring PU to the current PU such that the left neighboring PU to the MER has the same vertical position as the upper-left neighboring PU to the current PU.

46. The device of claim 39, wherein the video encoder is configured to substitute, when the neighboring PU corresponds to an upper-left neighboring PU to the current PU, an upper neighboring PU to the MER for the upper-left neighboring PU to the current PU such that the upper neighboring PU to the MER has the same horizontal position as the upper-left neighboring PU to the current PU.

47. The device of claim 38, wherein the device comprises at least one of:
   an integrated circuit;
   a microprocessor; and
   a wireless communication device.

* * * * *